(12) United States Patent
Wonhong et al.

(10) Patent No.: US 10,166,912 B2
(45) Date of Patent: Jan. 1, 2019

(54) AUTOMOTIVE LED DRIVING APPARATUS

(71) Applicant: SL Corporation, Daegu (KR)

(72) Inventors: Jeon Wonhong, Gyeonsangbuk-do (KR); Seung Mok Yang, Gyeonsangbuk-do (KR); Jong Young Kim, Gyeonsangbuk-do (KR); Sun Kyoung Park, Gyeonsangbuk-do (KR)

(73) Assignee: SL Corporation, Daegu (KR)

( * ) Notice: Subject to any disclaimer, the term of this patent is extended or adjusted under 35 U.S.C. 154(b) by 0 days.

(21) Appl. No.: 15/673,502

(22) Filed: Aug. 10, 2017

(65) Prior Publication Data

US 2018/0050631 A1  Feb. 22, 2018

(30) Foreign Application Priority Data

Aug. 19, 2016 (KR) .................. 10-2016-0105532
Dec. 23, 2016 (KR) .................. 10-2016-0178157
Dec. 23, 2016 (KR) .................. 10-2016-0178159
Dec. 29, 2016 (KR) .................. 10-2016-0182493

(51) Int. Cl.
*B60Q 1/14* (2006.01)
*B60Q 11/00* (2006.01)
(Continued)

(52) U.S. Cl.
CPC .......... *B60Q 1/1423* (2013.01); *B60Q 11/005* (2013.01); *H05B 33/083* (2013.01); *B60Q 11/00* (2013.01); *H05B 37/036* (2013.01)

(58) Field of Classification Search
CPC .... B64D 2203/00; B64D 47/04; B64D 47/06; F21V 17/005; F21V 17/12;
(Continued)

(56) References Cited

U.S. PATENT DOCUMENTS

2007/0273306 A1* 11/2007 Fujino ............... H05B 33/0815
                                                        315/312
2010/0117538 A1* 5/2010 Fujino ............... H02M 3/33507
                                                        315/77
(Continued)

FOREIGN PATENT DOCUMENTS

EP    2 713 678 A1   4/2014
WO   2016/037780 A1   3/2016

OTHER PUBLICATIONS

C. Nelson, "LT1070 Design Manual" Linear Technology, Application Note 19, Jun. 1986.
(Continued)

*Primary Examiner* — Alexander H Taningco
*Assistant Examiner* — Renan Luque
(74) *Attorney, Agent, or Firm* — Mintz Levin Cohn Ferris Glovsky and Popeo, P.C.; Kongsik Kim; Carolina Säve

(57) ABSTRACT

An LED driving apparatus group in which first and second LED groups are connected in series is provided. The apparatus includes a voltage input unit that receives an input voltage from a vehicle power device and a current controller that generates a current with a predetermined level by adjusting the received input voltage and provides the current to an input terminal of the first LED group. A first feedback path feeds back a voltage applied to a first node, which is connected to an output terminal of the first LED group, to an input terminal of the current controller. A first switching unit is disposed on the first feedback path and is switched on or off based on a control signal. A second switching unit is disposed between an output terminal of the second LED group and ground and is switched on or off based on the control signal.

16 Claims, 21 Drawing Sheets

(51) Int. Cl.
*H05B 33/08* (2006.01)
*H05B 37/03* (2006.01)

(58) Field of Classification Search
CPC ............ F21V 19/0035; F21V 19/0055; F21V 23/005; F21V 29/83; F21V 31/005; F21V 5/007; F21V 7/0091; F21W 2107/10; F21W 2107/17; F21W 2107/30; F21Y 2105/10; F21Y 2115/10; G01R 31/2635; G01R 31/44; H01L 23/36; H01L 2924/00; H01L 2924/0002; H05B 33/089; H05B 33/0893; H05B 37/03

See application file for complete search history.

(56) References Cited

U.S. PATENT DOCUMENTS

| | | | | |
|---|---|---|---|---|
| 2011/0260617 | A1* | 10/2011 | Tanaka | H05B 33/0815 |
| | | | | 315/82 |
| 2013/0307422 | A1* | 11/2013 | Palmer | H05B 33/0854 |
| | | | | 315/186 |
| 2014/0091724 | A1* | 4/2014 | Palmer | H02M 3/1582 |
| | | | | 315/201 |
| 2014/0159598 | A1* | 6/2014 | Boezen | H05B 33/0848 |
| | | | | 315/193 |
| 2014/0239851 | A1 | 8/2014 | Aoki et al. | |
| 2015/0069906 | A1* | 3/2015 | Niedermeier | H05B 33/0803 |
| | | | | 315/77 |
| 2015/0069908 | A1* | 3/2015 | Fukui | H05B 33/0815 |
| | | | | 315/82 |
| 2015/0264754 | A1 | 9/2015 | Ito et al. | |
| 2016/0212815 | A1* | 7/2016 | Watanabe | H05B 33/0845 |
| 2017/0003487 | A1* | 1/2017 | Endo | G02B 21/08 |
| 2017/0290118 | A1* | 10/2017 | Takagimoto | H05B 33/0845 |
| 2017/0305326 | A1* | 10/2017 | Katsura | H05B 33/08 |

OTHER PUBLICATIONS

MAXIM Integrated Products "1.5MHz, 30A High-Efficiency, LED Driver with Rapid LED Current Pulsin", 2009.

* cited by examiner

AUTOMOTIVE LED DRIVING APPARATUS

This application claims priority to Korean Application No. 10-2016-0105532 filed on Aug. 19, 2016, Korean Application No. 10-2016-0182493 filed on Dec. 29, 2016, Korean Application No. 10-2016-0178157 filed on Dec. 23, 2016, and Korean Application No. 10-2016-1078159 filed on Dec. 23, 2016. The applications are incorporated herein by reference.

BACKGROUND

1. Field of the Disclosure

The present disclosure relates to an automotive light-emitting diode (LED) driving apparatus, and more particularly, to an automotive LED driving apparatus for driving a plurality of LED groups.

2. Description of the Related Art

In general, a vehicle includes various lamps that have a lighting function for enabling a driver to more easily recognize objects around the vehicle when driving at night and a signaling function for informing other vehicles or pedestrians of a driving state of the vehicle. For example, a head lamp and a fog lamp are used for the lighting function, and a turn signal light, a tail lamp, a brake lamp, and a side marker are used for the signaling function. Among various lamps for a vehicle, a headlamp, which improves the front view of the vehicle plays an important role in safety driving. With the development of light-emitting diodes (LEDs), LEDs have been widely used as light sources for automotive headlamps.

To operate a light-emitting module such as an automotive LED, a constant current supply module such as a light-emitting module driver is used. Particularly, since a low beam or a high beam of the lamp requires a high intensity of radiation, the output power of the light-emitting module is required to be high. Accordingly, the power consumption and the heat generation amount of the light-emitting module driver may vary based on the efficiency of the light-emitting module driver. The light emitting module driver uses the buck, boost, or buck-boost topology for a direct current-direct current (DC/DC) converter based on the configuration of the light-emitting module such as an LED. Recently, since the efficiency of automotive LEDs has improved, the number of LEDs used to form a low beam or a high beam has been reduced, and as a result, the buck-boost topology, rather than the conventional boost topology, has increasingly been used.

The buck-boost topology, however, is less efficient than the buck or boost topology, resulting in high power consumption and high heat dissipation. Thus, a method is needed to improve the structure of a DC/DC converter for designing a high-efficiency light-emitting module driver without causing a flicker phenomenon. Additionally, since a light-emitting module driver for a low beam and a light emitting module driver for a high beam are provided separately, multiple light-emitting module drivers are required to output a low beam or a high beam. Thus, a method is needed to address this inconvenience.

SUMMARY

The present disclosure provides an automotive light-emitting diode (LED) driving apparatus for effectively improving the structure of an LED driving apparatus for controlling a plurality of LED groups separately. The present disclosure also provides an automotive LED driving apparatus capable of dynamically modifying the configuration of a DC/DC converter for designing a high-efficiency LED driving apparatus.

Additionally, the present disclosure provides an automotive LED driving apparatus capable of preventing an LED flicker phenomenon, which may occur due to the difference between a voltage control speed when outputting a current and a switching speed during a switching operation when changing the mode of a converter, by adjusting the switching speed. The present disclosure also provides an automotive LED driving apparatus capable of dynamically modifying the configuration of a converter of an LED unit in which a plurality of LED modules are connected in series, detecting a failure from the LED unit, and identifying the location of an LED module with the detected failure.

However, exemplary embodiments of the present disclosure are not restricted to those set forth herein. The above and other exemplary embodiments of the present disclosure will become more apparent to one of ordinary skill in the art to which the present disclosure pertains by referencing the detailed description of the present disclosure given below.

According to an exemplary embodiment of the present disclosure, an LED driving apparatus for driving an LED group in which first and second LED groups are connected in series may include: a voltage input unit configured to receive an input voltage from a power device of a vehicle; a current controller configured to generate a current with a predetermined level by adjusting the input voltage, received from the voltage input unit, and configured to provide the generated current to an input terminal of the first LED group; a first feedback path configured to feed back a voltage applied to a first node, which is connected to an output terminal of the first LED group, to an input terminal of the current controller; a first switching unit disposed on the first feedback path and switched on or off based on a control signal received from a controller of the vehicle; and a second switching unit disposed between an output terminal of the second LED group and a ground and switched on or off based on the control signal.

The automotive LED driving apparatus may further include: a first switching speed controller configured to adjust a switching speed of the first switching unit; and a second switching speed controller configured to adjust a switching speed of the second switching unit. The automotive LED driving apparatus may further include an LED failure detection unit configured to measure a first voltage at the input terminal of the first LED group and determine whether failure has occurred in the LED unit based on the measured first voltage.

According to the exemplary embodiments, an automotive LED driving apparatus for effectively improving the structure of an LED driving apparatus for controlling a plurality of LED groups separately may be provided. In addition, an automotive LED driving apparatus capable of preventing an LED flicker phenomenon, which may occur due to the difference between a voltage control speed when outputting a current and a switching speed during a switching operation when changing the mode of a converter, by adjusting the switching speed may be provided. Moreover, an automotive LED driving apparatus capable of dynamically modifying the configuration of a converter of an LED unit in which a plurality of LED modules are connected in series, detecting a failure from the LED unit, and identifying the location of an LED module with the detected failure may be provided.

Other features and exemplary embodiments may be apparent from the following detailed description, the drawings, and the claims.

BRIEF DESCRIPTION OF THE DRAWINGS

The above and other exemplary embodiments and features of the present disclosure will become more apparent by describing in detail exemplary embodiments thereof with reference to the attached drawings, in which.

DETAILED DESCRIPTION

Figure 1:
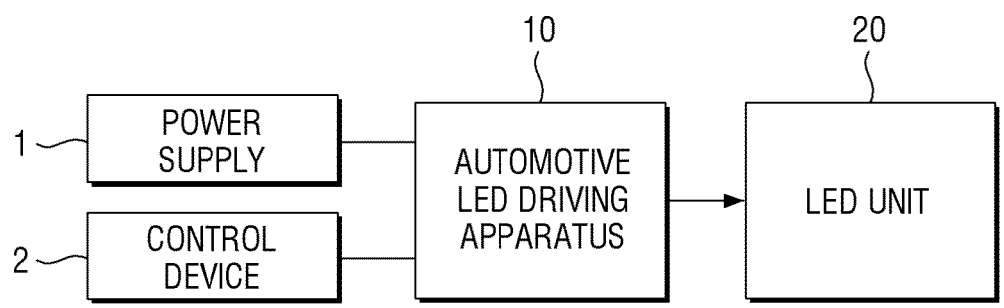
FIG. 1 is a block diagram of an automotive lamp according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in networked coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will hereinafter be described with reference to the accompanying drawings. The present disclosure may, however, be embodied in many different provides and should not be construed as being limited to the exemplary embodiments set forth herein. Rather, these exemplary embodiments are provided so that this disclosure will be thorough and complete and will fully convey the concept of the present disclosure to those skilled in the art, and the present disclosure will only be defined by the appended claims. Like reference numerals refer to like elements throughout the specification. In the drawings, the shape and size of features may be exaggerated for clarity.

FIG. 1 is a block diagram of an automotive lamp according to an exemplary embodiment of the present disclosure. Referring to FIG. 1, the automotive lamp according to the exemplary embodiment of FIG. 1 may include an automotive light-emitting diode (LED) driving apparatus 10, configured to operate an LED unit 20 based on input power provided by a power device 1 of a vehicle and a control signal received from a control device 2 (e.g., a controller) of the vehicle.

The LED unit 20 may include a plurality of LED groups, and each of the LED groups may include one or more LED modules. Each of the LED groups may be one of a low beam lamp, a high beam lamp, a daytime driving lamp, a vehicle width lamp, a brake lamp, a turn signal lamp, and a backup lamp. The automotive LED driving apparatus 10 may be configured to select at least one of the LED groups based on the control signal received from the control device 2, generate a current with a predetermined level by adjusting an input voltage received from the power device 1, and provide the generated current to the selected LED group(s). The automotive LED driving apparatus 10 may be configured to operate either as a boost converter or as a buck-boost converter by adjusting the path of the current provided to the selected LED group(s) based on the output voltage of the selected LED group(s).

Figure 2:
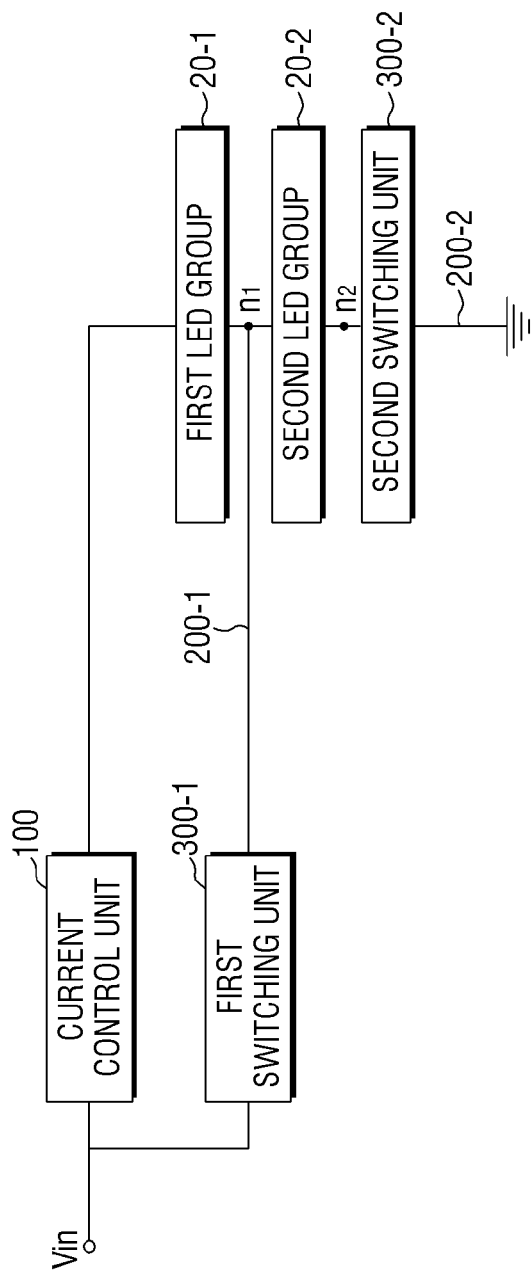
FIG. 2 is a schematic view of an automotive light-emitting diode (LED) driving apparatus according to an exemplary embodiment of the present disclosure.

The automotive LED driving apparatus 10 will hereinafter be described with reference to FIGS. 2 through 8. FIG. 2 is a schematic view of an automotive LED driving apparatus according to an exemplary embodiment of the present disclosure. Referring to FIG. 2, an automotive LED driving apparatus 10 may be configured to operate an LED unit 20 in which first and second LED groups 20-1 and 20-2 are connected in series, and may include a voltage input unit Vin, a current controller 100, a first feedback path 200-1, and a first ground path 200-2.

The voltage input unit Vin may be configured to provide an input voltage received from a power device 1 of a vehicle to the current controller 100. The current controller 100 may be configured to generate a current with a predetermined level by adjusting the input voltage provided by the voltage input unit Vin, and may be configured to provide the generated current to an input terminal of the first LED group 20-1. In response to a first switching unit 300-1 or a second switching unit 300-2 being selected in accordance with a control signal received from a control device 2 of a vehicle, the current controller 100 may be configured to operate either as a buck-boost converter or as a boost converter.

The current controller 100 will be described later with reference to FIGS. 3 through 7. The first feedback path 200-1 may feed back a voltage applied to a first node $n_1$ to an input terminal of the current controller 100. In other words, the first feedback path 200-1 may connect the first node $n_1$ between the first and second LED groups 20-1 and 20-2 and the input terminal of the current controller 100. The first ground path 200-2 may connect a second node $n_2$ to a ground.

The first switching unit 300-1, which is switched on or off based on the control signal received from the control device 2, may be disposed on the first feedback path 200-1. The second switching unit 300-2, which is switched on or off based on the control signal received from the control device 2, may be disposed on the first ground path 200-2. For example, the control signal received from the control device 2 may include a control signal that turns on one of the first and second switching units 300-1 and 300-2 and turns off the other switching unit.

When the first switching unit 300-1 is turned on and the second switching unit 300-2 is turned off based on the control signal received from the control device 2, the first LED group 20-1 may be turned on, and the second LED group 20-2 may be turned off. The current controller 100 may be configured to operate either as a buck-boost converter or as a boost converter based on which of the first and second switching units 300-1 and 300-2 is turned on by the control signal received from the control device 2. In particular, when the first switching unit 300-1 is turned on, the voltage applied to the first node $n_1$ may be fed back to the input terminal of the current controller 100 via the first feedback path 200-1, and the current controller 100 may be configured to operate as a buck-boost converter.

Figure 3:
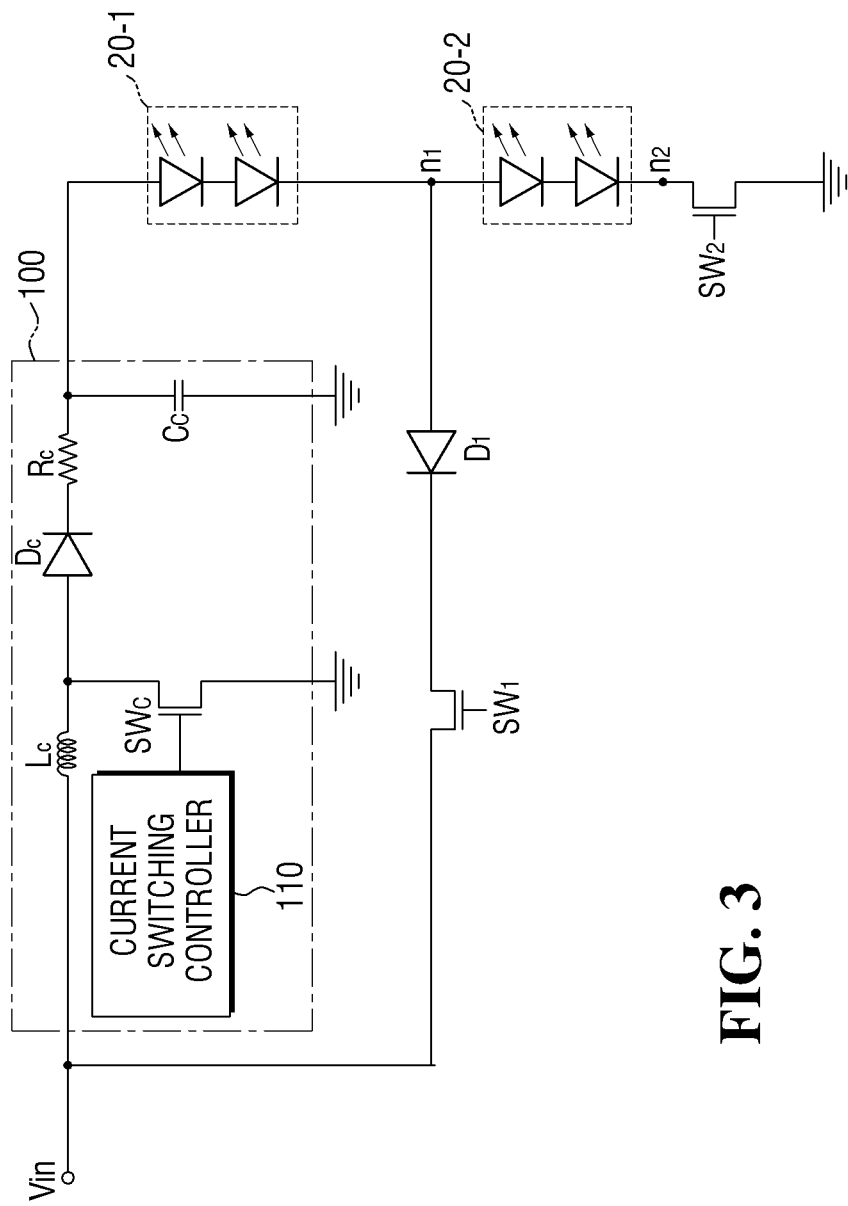
FIG. 3 is a circuit diagram of the automotive LED driving apparatus of FIG. 2 according to an exemplary embodiment of the present disclosure.

Furthermore, when the second switching unit 300-2 is turned on, the first node $n_1$ may be connected to the ground via the first ground path 200-2, and the current controller 100 may be configured to operate as a boost converter. The current controller 100, which operates either as a buck-boost converter or as a boost converter, will hereinafter be described with reference to FIGS. 3 through 8. FIG. 3 is a circuit diagram of the automotive LED driving apparatus of FIG. 2.

Referring to FIG. 3, the current controller 100 may include an LC filter ($L_c$ and $C_c$), a current control switch $SW_c$, a diode $D_c$, a current measuring resistor $R_c$, and a current switching controller 110. The LC filter ($L_c$ and $C_c$) may include an inductor $L_c$ and a capacitor $C_c$. A first side of the inductor $L_c$ may be connected to the voltage input unit Vin, and a second side of the inductor $L_c$ may be connected to the current control switch $SW_c$ and the diode $D_c$. The capacitor $C_c$ may be connected in parallel to the LED unit 20. The inductor $L_c$ and the capacitor $C_c$ of the LC filter ($L_c$ and $C_c$) may be charged or discharged based on a switching operation of the current control switch $SW_c$, and the voltage provided to the LED unit 20 may be adjusted by the energy charged into, or discharged from, the inductor $L_c$ and the capacitor $C_c$ of the LC filter ($L_c$ and $C_c$).

The current control switch $SW_c$ may be connected to the second side of the inductor $L_c$ and the ground and may be adjusted by the current switching controller 110. For example, the current control switch $SW_c$ may be a metal-oxide-semiconductor field effect transistor (MOSFET) having a gate to which a control signal received from the current switching controller 110 may be input. The control signal received from the current switching controller 110 may be a pulse width modulation (PWM) signal, and the current control switch $SW_c$ may be switched on or off based on the duty ratio of the PWM signal.

A first side of the diode $D_c$ may be connected to the second side of the inductor $L_c$, and a second side of the diode $D_c$ may be connected to a first side of the current measuring resistor $R_c$. The diode $D_c$ may be configured to block the reverse flow of a current input to the LED unit 20. The first side of the current measuring resistor $R_c$ may be connected to the second side of the diode $D_c$, and a second side of the current measuring resistor $R_c$ may be connected to a first side of the capacitor $C_c$.

Further, the current switching controller 110 may be configured to measure a voltage applied to the current measuring resistor $R_c$ and compare the measured voltage with a reference voltage to detect a variation in the current input to the LED unit 20. By adjusting a control signal output to the current control switch $SW_c$ based on the detected variation in the current input to the LED unit 20, the current switching controller 110 may be configured to adjust the voltage applied to the current measuring resistor $R_c$ and to thus provide a current with the predetermined level to the LED unit 20.

In an example, the control signal output to the current control switch $SW_c$ may be a PWM signal. In this example, in a case where the voltage applied to the current measuring resistor $R_c$ is higher than the reference voltage, the current switching controller 110 may generate a current with the predetermined level by reducing the duty ratio of the PWM signal so as to lower an output voltage. On the other hand, in a case where the voltage applied to the current measuring resistor $R_c$ is lower than the reference voltage, the current switching controller 110 may generate a current with the predetermined level by increasing the duty ratio of the PWM signal so as to raise the output voltage.

For example, each of the first and second switching units 300-1 and 300-2 may include a MOSFET having a gate to which the control signal received from the control device 2 may be input. A diode $D_1$, which blocks the reverse flow of a current output from the first node $n_1$ to the current controller 100, may be disposed on the first feedback path 200-1. Further, the automotive LED driving apparatus 10 may be configured to turn on one of first and second switching units $SW_1$ and $SW_2$ and turn off the other switching unit based on the control signal received from the control device 2. The current controller 100 of the automotive LED driving apparatus 10 may be configured to operate as a buck-boost converter when the first switching unit 300-1 is turned on, and operate as a boost converter when the second switching unit 300-2 is turned on.

Figure 4:
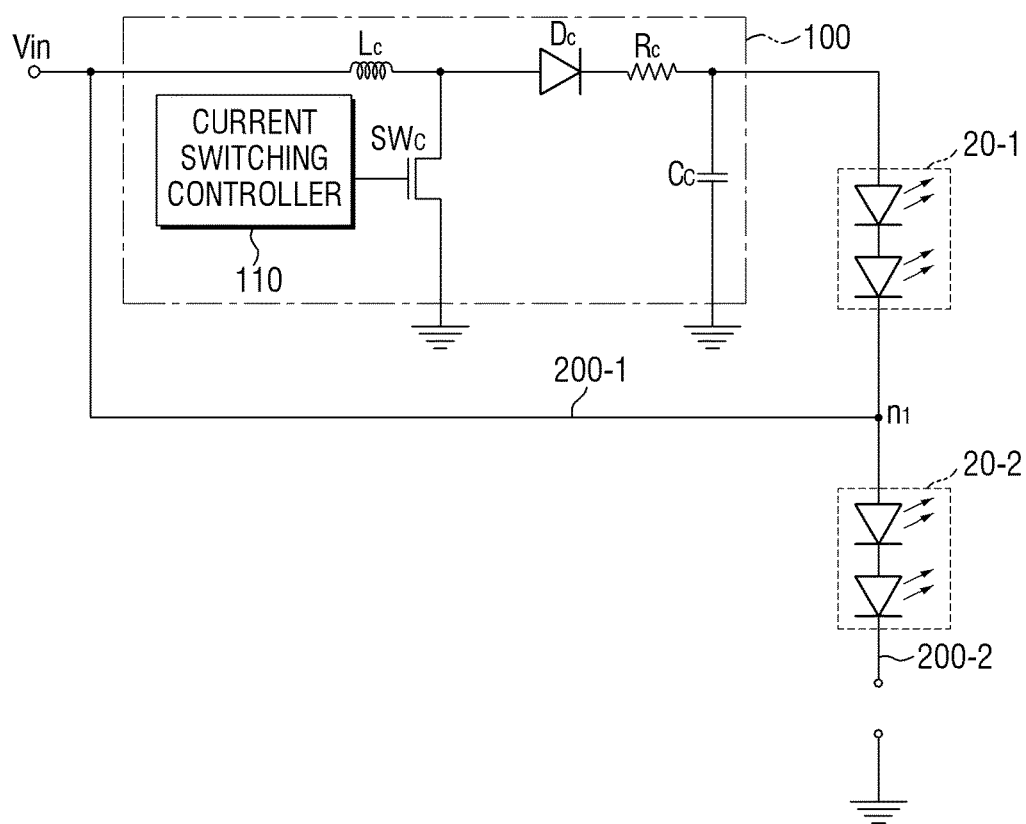
FIG. 4 is an equivalent circuit diagram illustrating a first switching unit of the automotive LED driving apparatus of FIG. 3 turned on according to an exemplary embodiment of the present disclosure.
Figure 5:
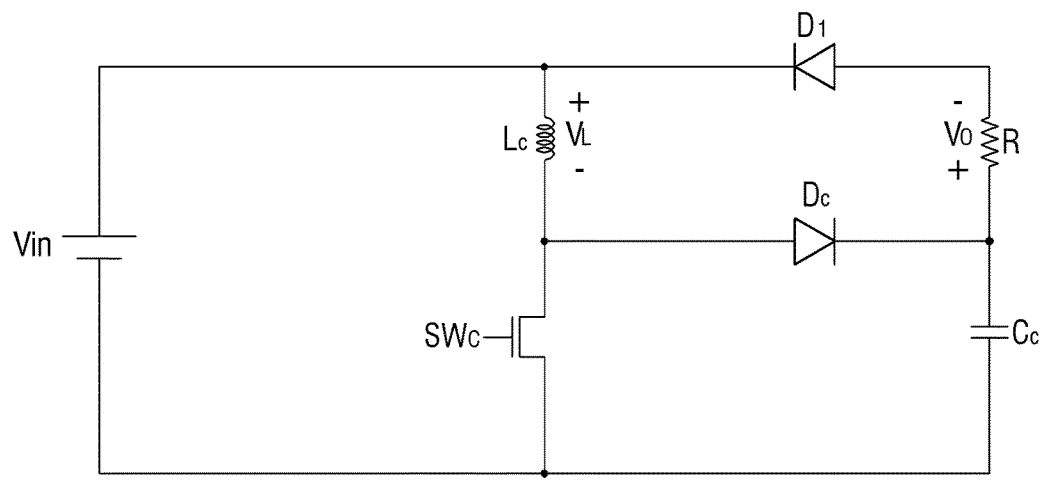
FIG. 5 is a circuit diagram illustrating a current controller of FIG. 3 operating as a buck-boost converter according to an exemplary embodiment of the present disclosure.

The operation of the current controller 100 as a buck-boost converter will hereinafter be described with reference to FIGS. 4 and 5. The operation of the current controller 100 as a boost converter will be described later with reference to FIGS. 6 and 7. FIG. 4 is an equivalent circuit diagram illustrating the first switching unit of the automotive LED driving apparatus of FIG. 3 turned on, and FIG. 5 is a circuit diagram illustrating a current controller of FIG. 3 operating as a buck-boost converter.

Referring to FIG. 4, when the first switching unit $SW_1$ is turned on, the first node $n_1$ may be connected to the input terminal of the current controller 100, and the second switching unit $SW_2$ may be turned off. As a result, the first ground path 200-2 may be blocked. In particular, a current input to the first LED group 20-1 may be fed back to the input terminal of the current controller 100 via the first feedback path 200-1 to which the first node $n_1$ is connected, and as a result, the first LED group 20-1 may be turned on. When the first switching unit $SW_1$ is turned on, the first feedback path 200-1 may be connected to the current switching controller 110 by the first switching unit $SW_1$, and as a result, the current switching controller 110 may be configured to operate as a buck-boost converter. When the current switching controller 110 operates as a buck-boost converter, the equivalent circuit of the current switching controller 110 may have a regressive circuit configuration illustrated in FIG. 5. In particular, reference character R of FIG. 5 may represent the equivalent resistor of the first LED group 20-1.

Figure 6:
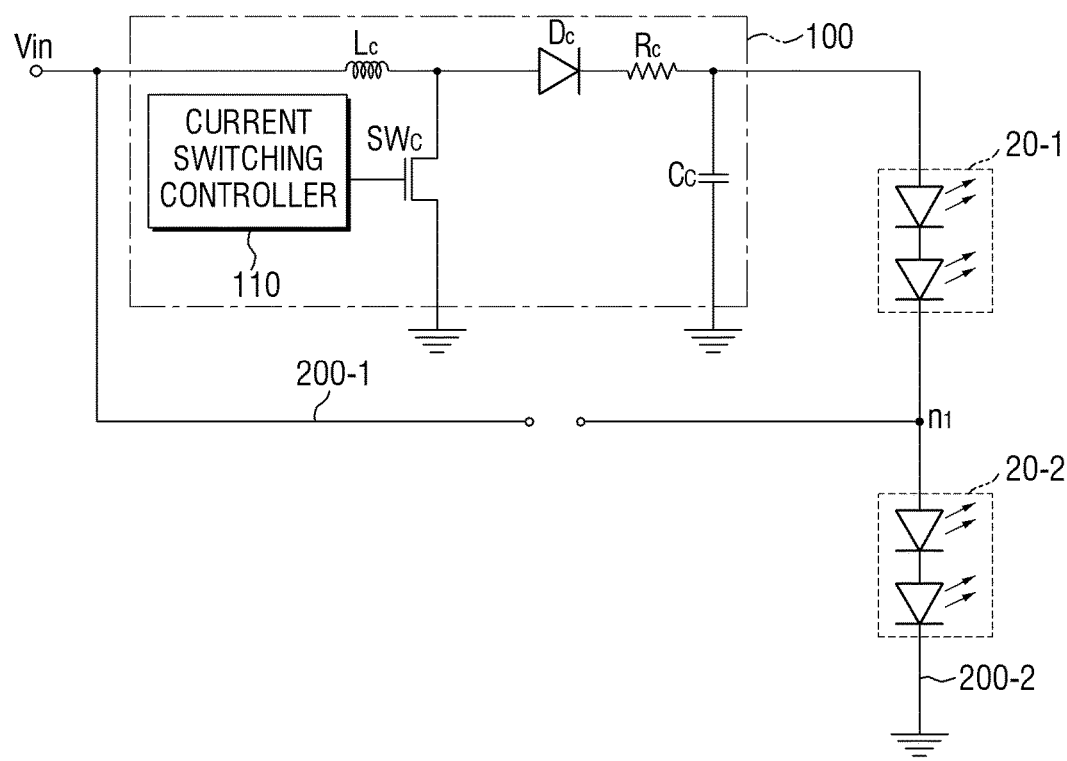
FIG. 6 is a circuit diagram illustrating a second switching unit of the automotive LED driving apparatus of FIG. 3 turned on according to an exemplary embodiment of the present disclosure.
Figure 7:
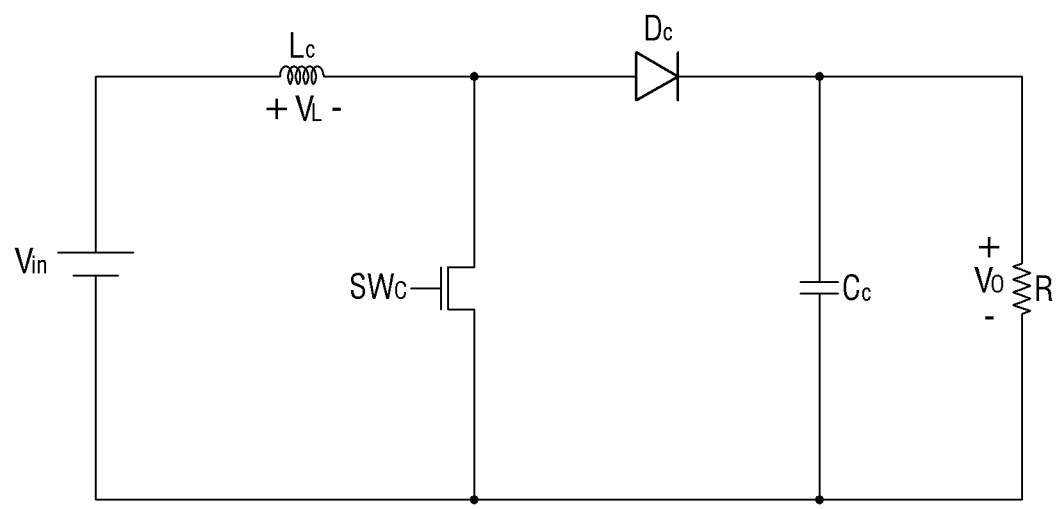
FIG. 7 is an equivalent circuit diagram illustrating the current controller of FIG. 3 operating as a boost converter according to an exemplary embodiment of the present disclosure.

FIG. 6 is a circuit diagram illustrating the second switching unit of the automotive LED driving apparatus of FIG. 3 turned on, and FIG. 7 is an equivalent circuit diagram for explaining a case where the current controller of FIG. 3 operates as a boost converter. Referring to FIG. 6, when the second switching unit $SW_2$ is turned on, the second node $n_2$ and the ground may be connected, and the first switching unit $SW_1$ may be turned off. As a result, the first feedback path 200-1 may be blocked. In particular, the current input to the first LED group 20-1 may flow to the ground connected to the first node $n_1$, and as a result, the first and second LED groups 20-1 and 20-2 may be turned on.

When the second switching unit $SW_2$ is turned on, the second node $n_2$ may be connected to the ground by the current switching controller 110 by the second switching unit $SW_2$, and as a result, the current switching controller 110 may be configured to operate as a boost converter. When the current switching controller 110 operates as a boost converter, the equivalent circuit of the current switching controller 110 may have a circuit configuration illustrated in FIG. 7. Particular, reference character R of FIG. 7 may represent the equivalent resistor of the first and second LED groups 20-1 and 20-2.

Figure 8:
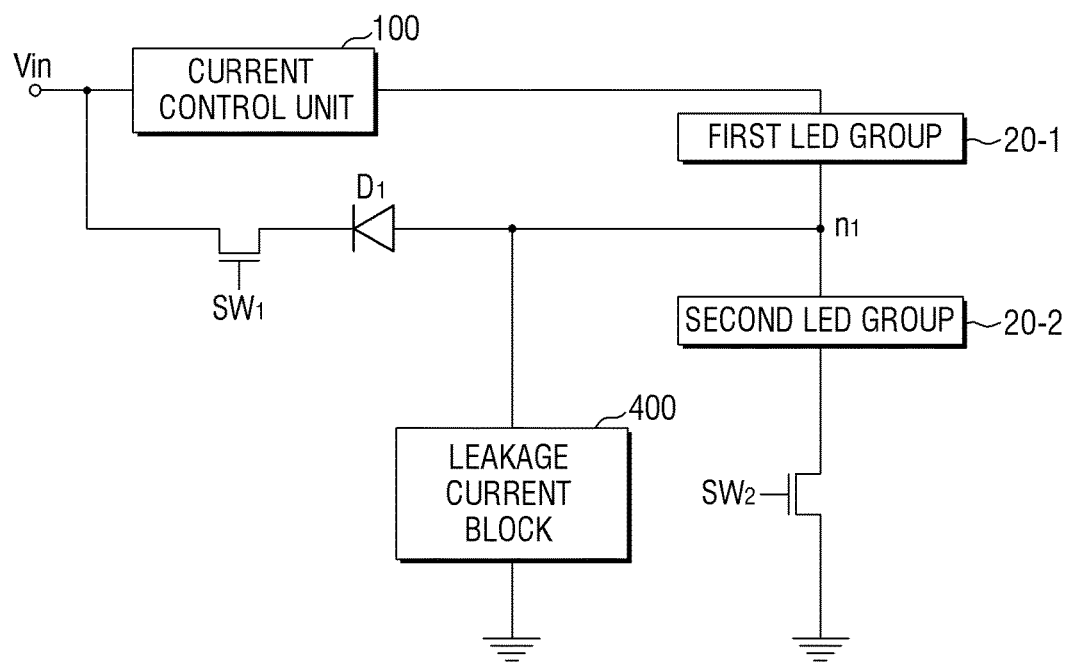
FIG. 8 is a schematic view of an automotive LED driving apparatus according to another exemplary embodiment of the present disclosure.

FIG. 8 is a schematic view of an automotive LED driving apparatus according to another exemplary embodiment of the present disclosure. Referring to FIG. 8, first and second LED groups 20-1 and 20-2 may correspond to a low beam and a high beam, respectively. For example, in response to a control signal that corresponds to a low beam being input, a first switching unit $SW_1$ may be turned on, and a second switching unit $SW_2$ may be turned off. As a result, the first LED group 20-1 may be turned on. Additionally, in response to a control signal that corresponds to a high beam being input, the first switching unit $SW_1$ may be turned off, and the second switching unit $SW_2$ may be turned on. As a result, the first and second LED groups 20-1 and 20-2 may both be turned on.

An automotive LED driving apparatus 10 may further include a leakage current block 400, connected in parallel to the second LED group 20-2 to adjust a current flowing to the second LED group 20-2 to be less than a predetermined reference current, in consideration of a current flowing to the first LED group 20-1 in response to a high beam being selected. For example, about 100% of an input current may be applied to the first LED group 20-1 for the first LED group 20-1 to output light, and about 20% of the input current may be applied to current flow regulator (e.g., a resistor) of the leakage current block 400, connected in parallel to the second LED group 20-2. As a result, about 80% of the input current may flow to the second LED group 20-2, and about 20% of the input current may flow to the leakage current block 400. Accordingly, the current applied to the second LED group 20-2 may be adjusted to differ from the current applied to the first LED group 20-1, and as a result, the amount of heat generated by the second LED group 20-2, which corresponds to a high beam, may be adjusted.

Figure 9:
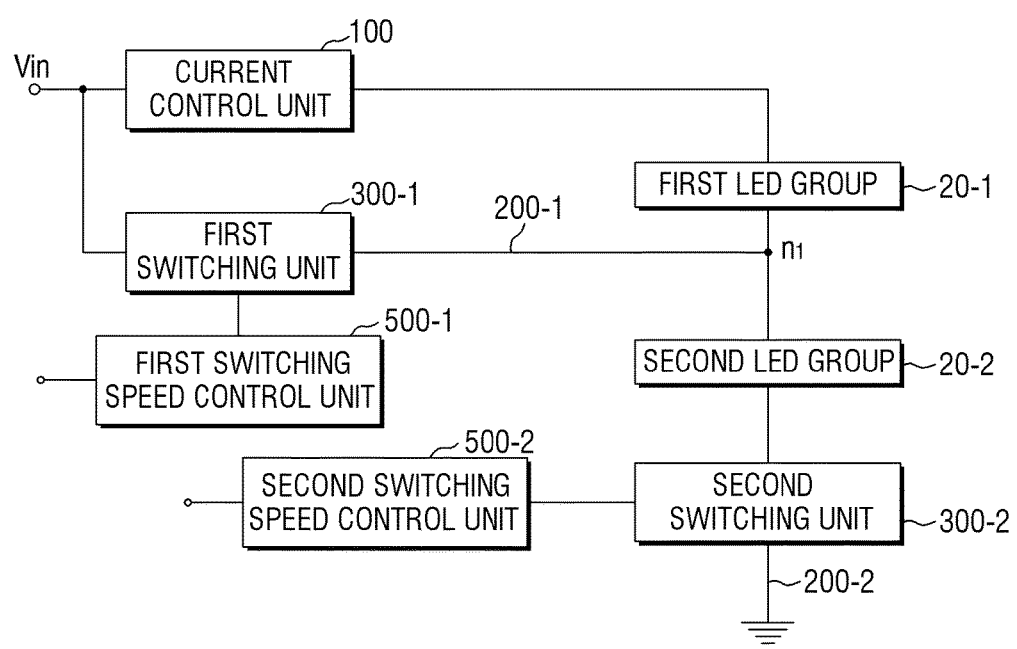
FIG. 9 is a schematic view of an automotive LED driving apparatus according to another exemplary embodiment of the present disclosure.

FIG. 9 is a schematic view of an automotive LED driving apparatus according to another exemplary embodiment of the present disclosure. Referring to FIG. 9, an automotive LED driving apparatus 10 may be configured to drive or operate first and second LED groups 20-1 and 20-2 based on a control signal received from a control device 2 of a vehicle, and may include a voltage input unit Vin, a current controller 100, a first feedback path 200-1, a first ground path 200-2, a first switching unit 300-1, a second switching unit 300-2, a first switching speed controller 500-1, and a second switching speed controller 500-2.

When the voltage of an LED unit including the first and second LED Groups 20-1 and 20-2 varies in accordance with switching operations of the first and second switching units 300-1 and 300-2, the current controller 100 may be configured to adjust an input voltage for outputting a current to the LED unit 20. However, when the voltage control speed of the current controller 100 for outputting a current is less than the switching speed of the first and second switching units 300-1 and 300-2, the LED unit 20 may not be able to be supplied with a sufficient current, and as a result, an LED flicker phenomenon may occur. Accordingly, the automotive LED driving apparatus 10 may include the first and second switching speed controllers 500-1 and 500-2.

Particularly, the first switching speed controller 500-1 may be configured to adjust the switching speed of the first switching unit 300-1. For example, the first switching speed controller 500-1 may be configured to delay the switching speed of the first switching unit 300-1 by a predetermined amount of time, and the predetermined amount of time may be in the range of about 0.1 ms to 40 ms. Similarly, the second switching speed controller 500-2 may be configured to adjust the switching speed of the second switching unit 300-2. For example, the second switching speed controller 500-2 may be configured to delay the switching speed of the second switching unit 300-2 by a predetermined amount of time, and the predetermined amount of time may be in the range of about 0.1 ms to 40 ms.

Figure 10:
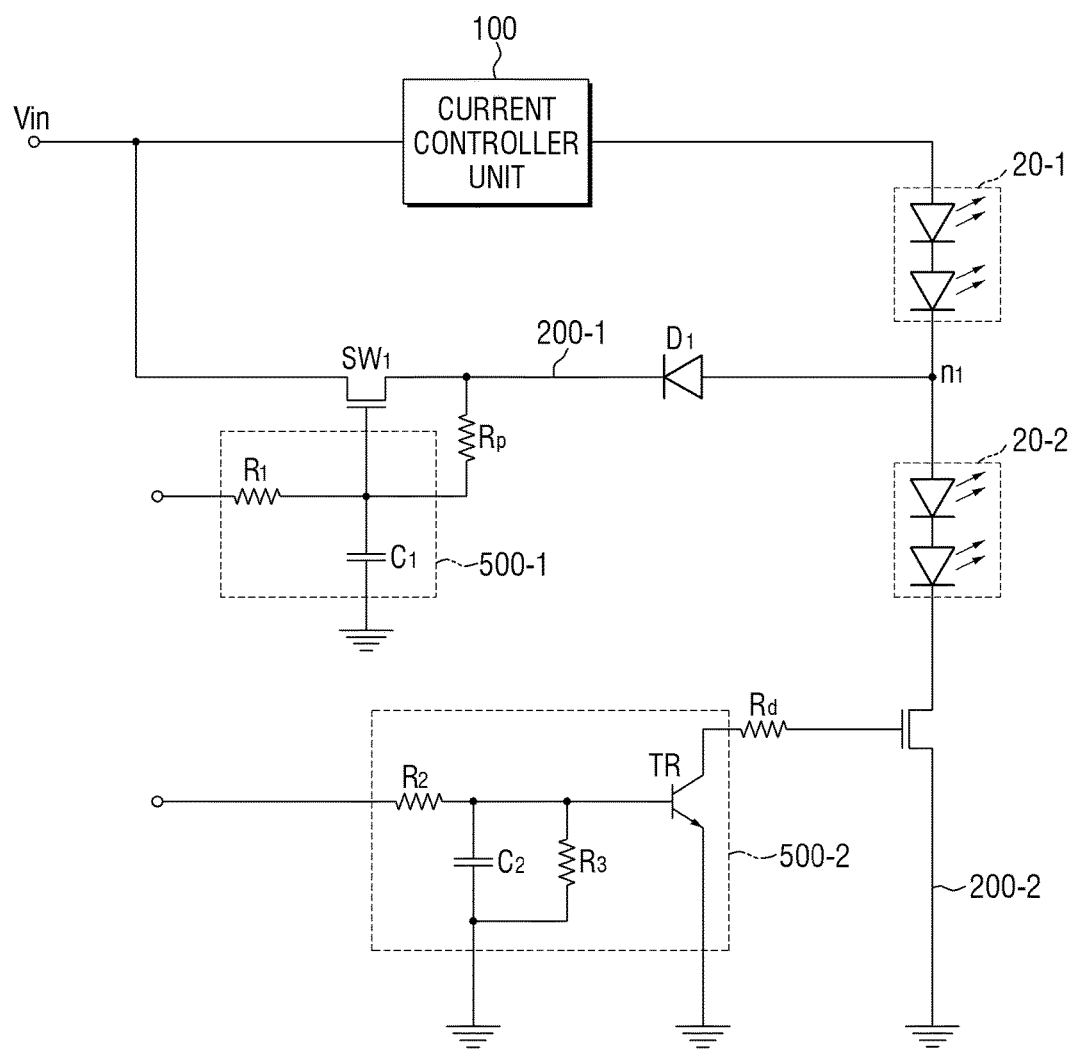
FIG. 10 is a circuit diagram showing first and second switching units of FIG. 9 according to an exemplary embodiment of the present disclosure.

The first and second switching speed controllers 500-1 and 500-2 will hereinafter be described with reference to FIG. 10. FIG. 10 is a circuit diagram showing the first and second switching units of FIG. 9. Referring to FIG. 10, the first switching speed controller 500-1 may include a first RC circuit ($R_1$ and $C_1$). The first RC circuit ($R_1$ and $C_1$) may include a first resistor $R_1$ and a first capacitor $C_1$.

Further, a first side of the first resistor $R_1$ may be configured to receive a control signal received from the control device 2, and a second side of the first resistor $R_1$ may be connected to the gate of a first switching unit $SW_1$. A first side of the first capacitor $C_1$ may be connected to the gate of the first switching unit $SW_1$, and a second side of the first capacitor $C_1$ may be connected to a ground. The time constant of the first RC circuit ($R_1$ and $C_1$) may be determined by the resistance of the first resistor $R_1$ and the capacitance of the first capacitor $C_1$. Accordingly, the first RC circuit ($R_1$ and $C_1$) may be configured to delay the control signal received from the control device 2 by an amount of time that corresponds to the time constant and provide the delayed control signal to the first switching unit $SW_1$.

For example, the control signal received from the control device 2 may be a PWM signal. When the control signal received from the control device 2 is a PWM signal, the control device 2 may be configured to adjust the amount of time by which the PWM signal is to be delayed by adjusting the duty ratio of the PWM signal. For example, the second switching speed controller 500-2 may include a bipolar junction transistor (BJT) "TR" and a second RC circuit ($R_2$, $R_3$, and $C_2$), connected to the base of the BJT "TR".

The control signal received from the control device 2 may be input to the base of the BJT "TR", the collector of the BJT "TR" may be connected to the base of a second switching unit $SW_2$, and the emitter of the BJT "TR" may be connected to the ground. The second RC circuit ($R_2$, $R_3$, and $C_2$) may include a second resistor $R_2$, a second capacitor $C_2$, and a third resistor $R_3$. A first side of the second resistor $R_2$ may be connected to an input terminal of the second RC circuit ($R_2$, $R_3$, and $C_2$) to which the control signal received from the control device 2 may be input, and a second side of the second resistor $R_2$ may be connected to the base of the BJT "TR". A first side of the second capacitor $C_2$ may be connected to the base of the BJT "TR", and a second side of the second capacitor $C_2$ may be connected to the ground. The third resistor $R_3$ may be connected in parallel to the second capacitor $C_2$.

A control signal delayed by an amount of time that corresponds to a time constant determined by the second RC circuit ($R_2$, $R_3$, and $C_2$) may be input to the second switching speed controller 500-2, which includes the BJT "TR" and the second RC circuit ($R_2$, $R_3$, and $C_2$), but switching delays may be drive more stably due to the voltage applied to the gate of a MOSFET being gradually increased by the BJT "TR".

FIG. 10 illustrates an example in which the first switching speed controller 500-1 includes the first RC circuit and the second switching speed controller 500-2 includes the BJT "TR" and the second RC circuit ($R_2$, $R_3$, and $C_2$), but the present disclosure is not limited thereto. In other words, alternatively, the first switching speed controller 500-1 may include the BJT "TR" and the second RC circuit ($R_2$, $R_3$, and $C_2$), and the second switching speed controller 500-2 may include the first RC circuit ($R_1$ and $C_1$). Additionally, the first and second switching speed controllers 500-1 and 500-2 may both include the first RC circuit ($R_1$ and $C_1$) or may both include the BJT "TR" and the second RC circuit ($R_2$, $R_3$, and $C_2$).

Figure 11:
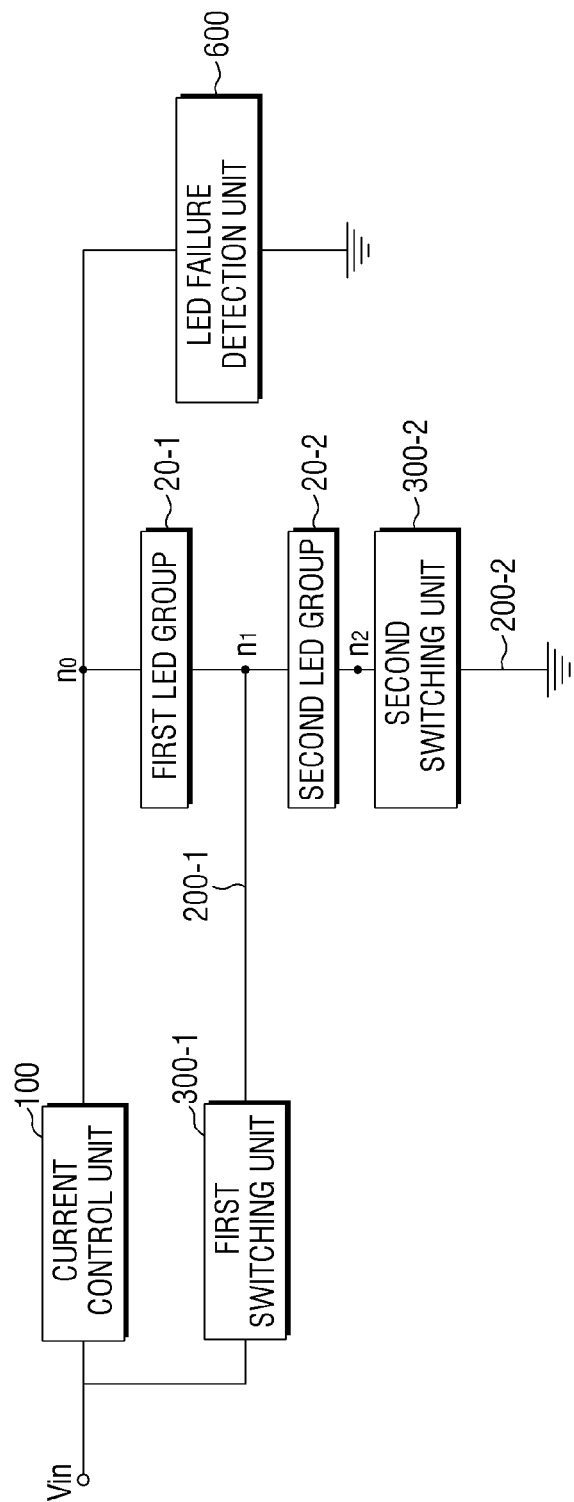
FIG. 11 is a schematic view of an automotive LED driving apparatus according to another exemplary embodiment of the present disclosure.

FIG. 11 is a schematic view of an automotive LED driving apparatus according to another exemplary embodiment of the present disclosure. Referring to FIG. 11, an automotive LED driving apparatus 10 may be configured to operate first and second LED groups 20-1 and 20-2 based on a control signal received from a control device 2 of a vehicle, and may include a voltage input unit Vin, a current controller 100, a first feedback path 200-1, a first ground path 200-2, a first switching unit 300-1, a second switching unit 300-2, and an LED failure detection unit 600.

The LED failure detection unit 600 may be configured to measure a first voltage at an input terminal of the first LED group 20-1, i.e., a node $n_0$, and may be configured to detect a failure in an LED unit 20 based on the measured first voltage. For example, the LED failure detection unit 600 may be configured to determine whether one or more LED modules included in each of the first and second LED groups 20-1 and 20-2 are open or short based on the measured first voltage. In addition, the LED failure detection unit 600 may be configured to adjust switching operations of the first and second switching units 300-1 and 300-2 to identify the location of failure detected from the LED unit 20 (i.e., the location of any open or short LED module in the LED unit 20).

Figure 12:
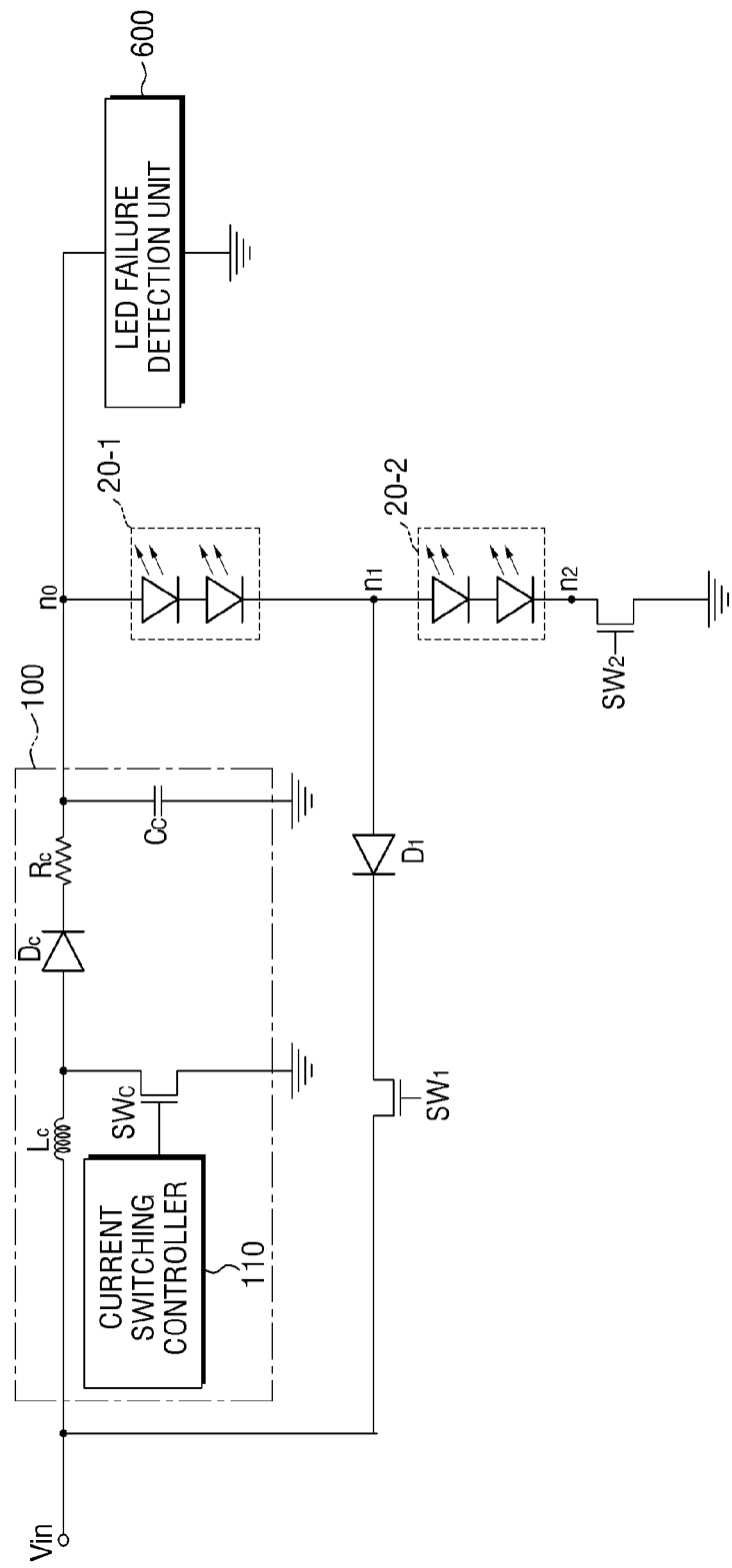
FIG. 12 is a circuit diagram of an example of the automotive LED driving apparatus of FIG. 11 according to an exemplary embodiment of the present disclosure.

The LED failure detection unit 600 of FIG. 11 will hereinafter be described with reference to FIGS. 12 and 13. FIG. 12 is a circuit diagram of an example of the automotive LED driving apparatus of FIG. 11. Referring to FIG. 12, an LED failure detection unit 600 may be configured to measure a first voltage applied to an input terminal $n_0$ of a first LED group 20-1 and may be configured to determine whether each of a plurality of LED modules included in an LED unit 20 is open or short based on the measured first voltage.

When any one of the LED modules included in the LED unit 20 is open, a current controller 100 may be configured to continue increasing a voltage output to the LED unit 20 to apply a current with a predetermined level to the LED unit 20. As a result, an over-voltage may be applied to the LED unit 20, and the components or elements of the automotive LED driving apparatus 10 or other LED modules in the LED unit 20 may be additionally damaged. Accordingly, the LED failure detection unit 600 may be configured to determine that at least one of the LED modules included in the LED unit 20 is open when the measured first voltage is greater than a predetermined first open reference voltage.

The first open reference voltage may be greater than a maximum voltage capable of being output to the LED unit 20, and may be less than the withstand voltage of a capacitor $C_c$ included in the current controller 100. The LED failure detection unit 600 may further be configured to identify the location of any open LED module in the LED unit 20 by operating the first and second switching units $SW_1$ and $SW_2$. For example, when the measured first voltage is greater than the first open reference voltage, the LED failure detection unit 600 may be configured to turn on the first and second switching units $SW_1$ and $SW_2$ one at a time (e.g., independently) in reverse order.

Specifically, when the measured first voltage is greater than the first open reference voltage, the LED failure detection unit 600 may be configured to turn on the second switching unit $SW_2$, turn off the first switching unit $SW_1$, and measure the first voltage again. Further, when the first voltage measured with the second switching unit $SW_2$ turned on is greater than the first open reference voltage, the LED failure detection unit 600 may be configured to turn on the first switching unit $SW_1$, turn off the second switching unit $SW_2$, and measure the first voltage yet again.

Additionally, when the first voltage measured with the first switching unit $SW_1$ turned on is less than the first open reference voltage, the LED failure detection unit 600 may be configured to detect an open LED module in the second LED group 20-2. When the first voltage measured with the first switching unit $SW_1$ turned on is greater than the first open reference voltage, the LED failure detection unit 600 may be configured to detect an open LED module in the first LED group 20-1.

For example, when the LED failure detection unit 600 detects an open LED module in the LED unit 20, the LED failure detection unit 600 may be configured to output a failure signal to a control device 2 of a vehicle. The LED failure detection unit 600 may also be configured to transmit location information of the failure detected from the LED unit 20 along with the failure signal to the control drive 2. In addition, when the measured first voltage is less than the first open reference voltage, the LED failure detection unit 600 may be configured to determine that at least one of the LED modules included in the LED unit 20 is short.

The LED failure detection unit 600 of FIG. 11, which detects any open or short LED module from the LED unit 20, will hereinafter be described in further detail with reference to FIG. 13. FIG. 13 is a circuit diagram of another example of the automotive LED driving apparatus of FIG. 11. The automotive LED driving apparatus of FIG. 13 is similar to the automotive LED driving apparatus of FIG. 12 except that it further includes an LED module voltage detection unit 700, configured to detect the voltage of any one of a plurality of LED modules included in an LED unit 20 to calculate a first short reference voltage required for an LED failure detection unit 600 to determine whether the LED modules included in the LED unit 20 are short.

Figure 13:
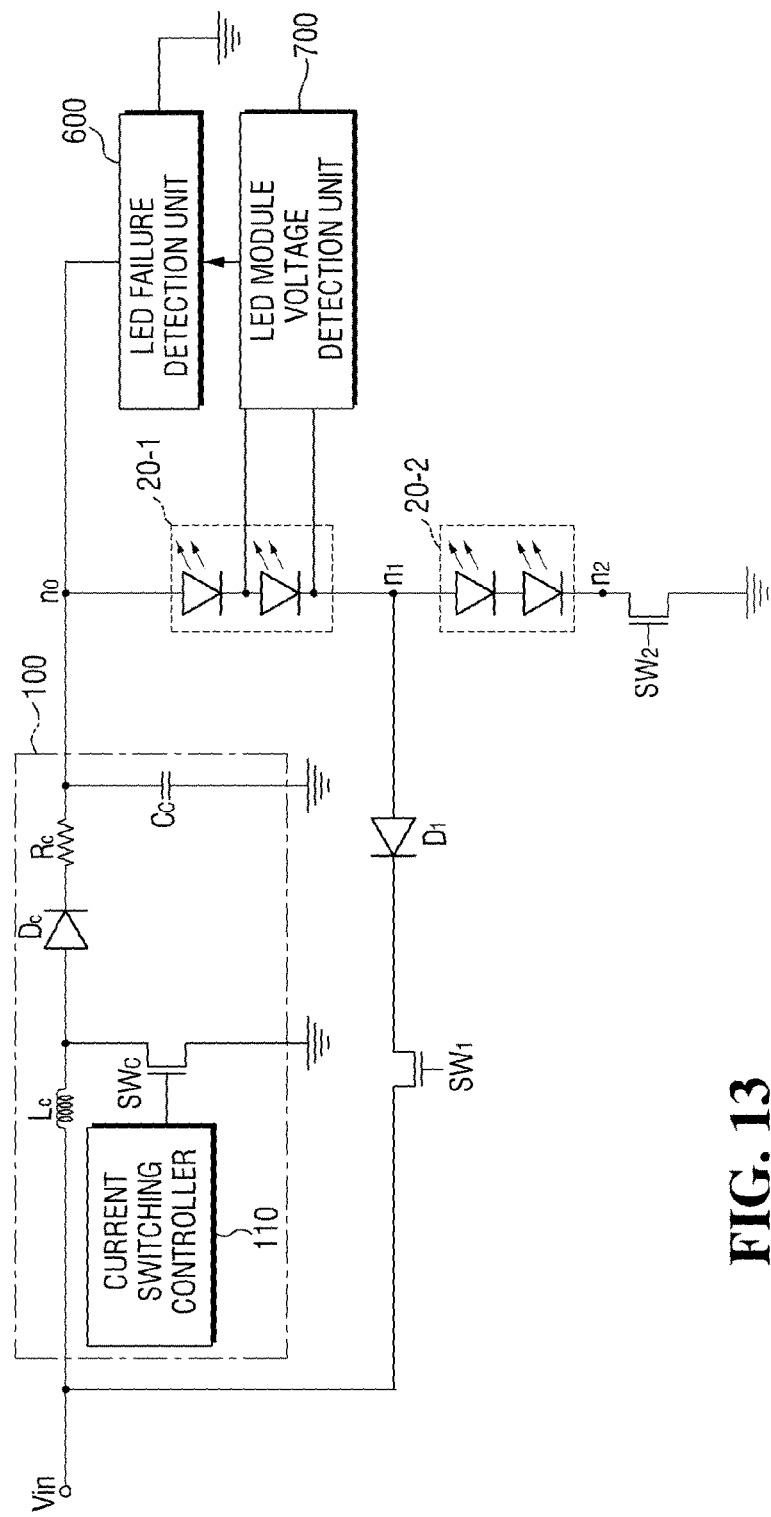
FIG. 13 is a circuit diagram of another example of the automotive LED driving apparatus of FIG. 11 according to an exemplary embodiment of the present disclosure.

Referring to FIG. 13, the LED module voltage detection unit 700 may be configured to measure the voltage of any one of the LED modules included in the LED unit 20. The LED module voltage detection unit 700 may be configured to output the measured voltage to the LED failure detection unit 600. The LED failure detection unit 600 may further be configured to calculate a first short reference voltage by multiplying the total number of LED modules included in the LED unit 20 by the measured voltage provided by the LED module voltage detection unit 700.

The LED failure detection unit 600 may be configured to determine whether the LED modules included in the LED unit 20 are short by comparing a first voltage with the first short reference voltage. Additionally, the LED failure detection unit 600 may be configured to identify the location of any short LED module in the LED unit 20 by operating first and second switching units $SW_1$ and $SW_2$. For example, when the measured first voltage is less than a first open reference voltage, the LED failure detection unit 600 may be configured to turn on the first and second switching units $SW_1$ and $SW_2$ one at a time (e.g., independently of one another) in reverse order.

In particular, when the measured first voltage is less than the first short reference voltage, the LED failure detection unit 600 may be configured to turn on the second switching unit $SW_2$, turn off the first switching unit $SW_1$, and measure the first voltage again. When the first voltage measured with the second switching unit $SW_2$ turned on is less than the first short reference voltage, the LED failure detection unit 600 may be configured to turn on the first switching unit $SW_1$, turn off the second switching unit $SW_2$, and measure the first voltage yet again.

Further, the LED failure detection unit 600 may be configured to compare the first voltage measured with the first switching unit $SW_1$ turned on with a first open reference voltage. The first open reference voltage may be obtained by multiplying the total number of LED modules included in a first LED group 20-1 of the LED unit 20 by the measured voltage provided by the LED module voltage detection unit 700. When the first voltage measured with the first switching unit $SW_1$ turned on is less than the first open reference voltage, the LED failure detection unit 600 may be configured to detect a short LED module in the first LED group 20-1.

Furthermore, when the first voltage measured with the first switching unit $SW_1$ turned on is greater than the first open reference voltage, the LED failure detection unit 600 may be configured to detect a short LED module in a second LED group 20-2 of the LED unit 20. For example, when a short LED module is detected in the LED unit 20, the LED failure detection unit 600 may be configured to output a failure signal to a control device 2 of a vehicle. The LED failure detection unit 600 may also be configured to transmit location information of failure detected from the LED unit 20 along with the failure signal to the control device 2.

Figure 14:
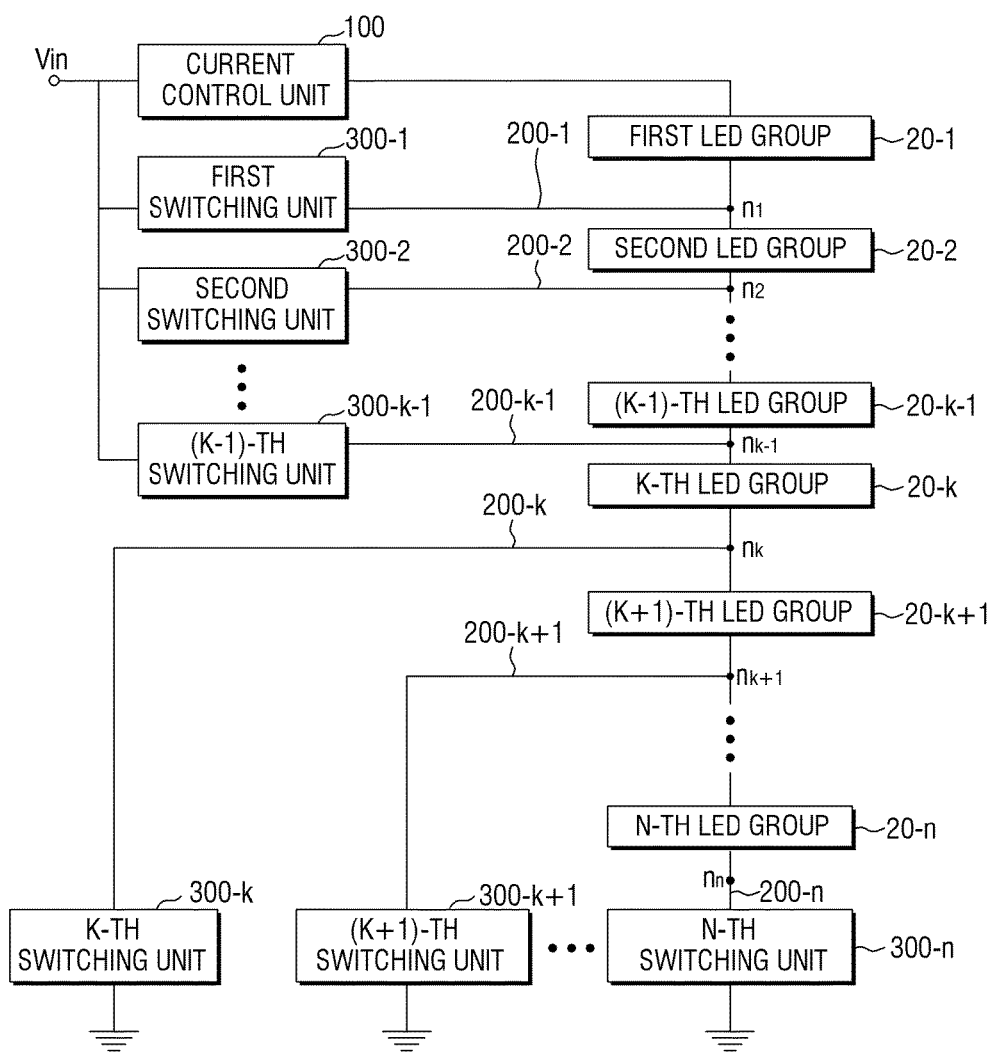
FIG. 14 is a schematic view of an automotive LED driving apparatus according to another exemplary embodiment of the present disclosure.

FIG. 14 is a schematic view of an automotive LED driving apparatus according to another exemplary embodiment of the present disclosure. Referring to FIG. 14, an automotive LED driving apparatus 10 may be configured to operate an LED unit 20 in which first through n-th LED groups 20-1 through 20-n are connected in series, and may include a voltage input unit Vin, a current controller 100, first through (k−1)-th feedback paths 200-1 through 200-k−1, k-th through n-th ground paths 200-k through 200-n, and first through n-th switching units 300-1 through 300-*n*, wherein n is a natural number equal to or greater than 2 and k is a natural number less than n.

The voltage input unit Vin may be configured to provide an input voltage received from a power device 1 of a vehicle to the current controller 100. The current controller 100 may be configured to generate a current with a predetermined level by adjusting the input voltage provided by the voltage input unit Vin, and may be configured to provide the generated current to an input terminal of the first LED group 20-1. In response to one of the first through n-th switching units 300-1 through 300-*n* being selected based on a control signal received from a control device 2 of a vehicle, the current controller 100 may be configured to operate either as a buck-boost converter or as a boost converter.

Figure 15:
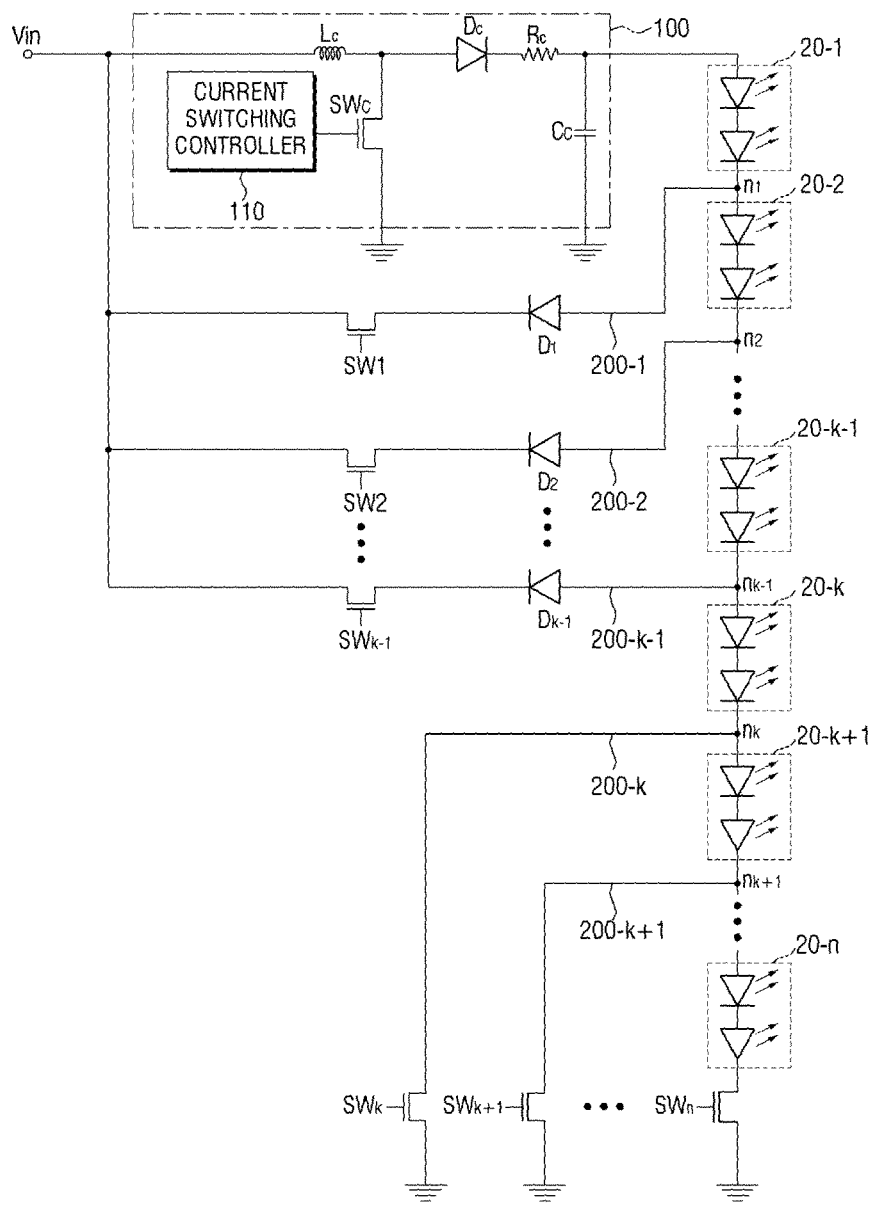
FIG. 15 is a circuit diagram of an example of the automotive LED driving apparatus of FIG. 14 according to an exemplary embodiment of the present disclosure.

The current controller 100 will be described later with reference to FIGS. 15 through 17. The first through (k−1)-th feedback paths 200-1 through 200-*k*−1 may feed back voltages applied to first through (k−1)-th node $n_1$ through $n_{k-1}$ to an input terminal of the current controller 100. In other words, the first feedback path 200-1 may connect the first node $n_1$ between the first and second LED groups 20-1 and 20-2 and the input terminal of the current controller 100, the second feedback path 200-2 may connect the second node $n_2$ between the second and third LED groups 20-2 and 20-3 and the input terminal of the current controller 100, and the (k−1)-th feedback path 200-*k*−1 may connect the (k−1)-th node $n_{k-1}$ between the (k−1)-th and k-th LED groups 20-*k*−1 and 20-*k* and the input terminal of the current controller 100

The k-th through n-th ground paths 200-*k* through 200-*n* may connect k-th through n-th nodes $n_k$ through $n_n$, respectively, to a ground. The first through (k−1)-th switching units 300-1 through 300-*k*−1, which are switched on or off based on the control signal received from the control device 2, may be disposed on the first through (k−1)-th feedback paths 200-1 through 200-*k*−1, respectively. The k-th through n-th switching units 300-*k* through 300-*n*, which are switched on or off based on the control signal received from the control device 2, may be disposed on the k-th through n-th ground paths 200-*k* through 200-*n*, respectively.

For example, the control signal received from the control device 2 may include a control signal that turns on one of the first through n-th switching units 300-1 through 300-*n* and turns off the other switching units. When an x-th switching unit 300-*x* (where x is a natural number between 1 and n) is turned on and the other switching units are turned off based on the control signal received from the control device 2, the first through x-th LED groups 20-1 through 20-*x* may be turned on, and the (x+1)-th through n-th LED groups 20-*x*+1 through 20-*n* may be turned off.

The current controller 100 may be configured to operate either as a buck-boost converter or as a boost converter based on whether x is less than or greater than k. In particular, when x is equal to or less than k−1, a voltage applied to an x-th node $n_x$ may be fed back to the input terminal of the current controller 100 via an x-th feedback path 200-*x*, and the current controller 100 may be configured to operate as a buck-boost converter. Further, when x is equal to or greater than k, the x-th node $n_x$ may be connected to the ground via an x-th ground path 200-*x*, and the current controller 100 may be configured to operate as a boost converter.

The current controller 100 of FIG. 14, which operates either as a buck-boost converter or as a boost converter, will hereinafter be described with reference to FIGS. 15 through 17. FIG. 15 is a circuit diagram of an example of the automotive LED driving apparatus of FIG. 14. Referring to FIG. 15, each of first through n-th switching units $SW_1$ through $SW_n$ may include a MOSFET having a gate to which a control signal received from a control device 2 of a vehicle is input.

First through (k−1)-th diodes $D_1$ through $D_{k-1}$, which block the reverse flow of currents output from first through (k−1)-th nodes $n_1$ through $n_{k-1}$ to a current controller 100, may be disposed on first through (k−1)-th feedback paths 200-1 through 200-*k*−1. The automotive LED driving apparatus 10 may be configured to turn on one of the first through n-th switching units $SW_1$ through $SW_n$ and turn off the other switching units based on the control signal received from the control device 2. The current controller 100 of the automotive LED driving apparatus 10 may be configured to operate as a buck-boost converter when one of the first through (k−1)-th switching units $SW_1$ through $SW_{k-1}$ is turned on, and may be configured to operate as a boost converter when one of the k-th through n-th switching units $SW_k$ through $SW_n$ is turned on.

The current controller 100 of FIG. 14 operating as a buck-boost converter will hereinafter be described with reference to FIG. 16. The current controller 100 of FIG. 14 operating as a boost converter will be described later with reference to FIG. 17. FIG. 16 is an equivalent circuit diagram for illustrating the third switching unit of the automotive LED driving apparatus of FIG. 14 turned on.

Figure 16:
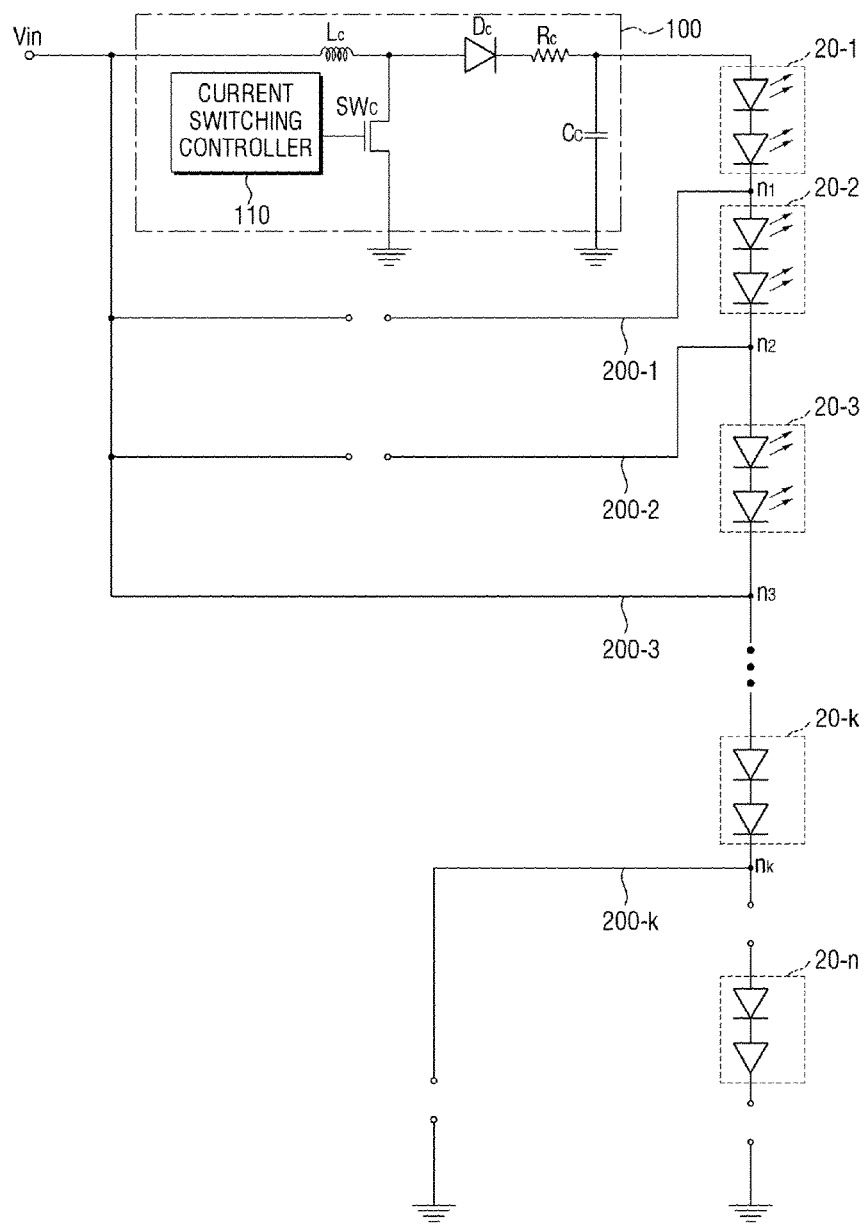
FIG. 16 is an equivalent circuit diagram illustrating a third switching unit of the automotive LED driving apparatus of FIG. 14 turned on according to an exemplary embodiment of the present disclosure.

Referring to FIG. 16, when the third switching unit $SW_3$ is turned on, the third node $n_3$ may be connected to the input terminal of the current controller 100, and the first, second, and fourth through n-th switching units $SW_1$, $SW_2$, and $SW_4$ through $SW_n$ may be turned off. As a result, the first, second, and fourth through (k−1)-th feedback paths 200-1, 200-2, and 200-4 through 200-*k*−1 and the k-th through n-th ground paths 200-*k* through 200-*n* may be blocked. In particular, the current input to the first LED group 20-1 may be fed back to the input terminal of the current controller 100 via the third feedback path 200-3 to which the third node $n_3$ is connected, and as a result, the first through third LED groups 20-1 through 20-3 may be turned on.

FIG. 16 illustrates an example in which k is greater than 3 and the third switching unit $SW_3$ is turned on, but the present disclosure is also applicable to a case where a switching unit that corresponds to a number less than k is turned on. In other words, when a switching unit that corresponds to a number less than k is turned on, a corresponding feedback path may be connected to a current switching controller 110 by the turned-on switching unit, and as a result, the constant current switching controller 110 may be configured to operate as a buck-boost converter. When the constant current switching controller 110 operates as a buck-boost converter, the equivalent circuit of the constant current switching controller 110 may have a regressive circuit configuration illustrated in FIG. 5. In particular, reference character R of FIG. 5 may represent the equivalent resistor of the first through third LED groups 20-1 through 20-3.

Figure 17:
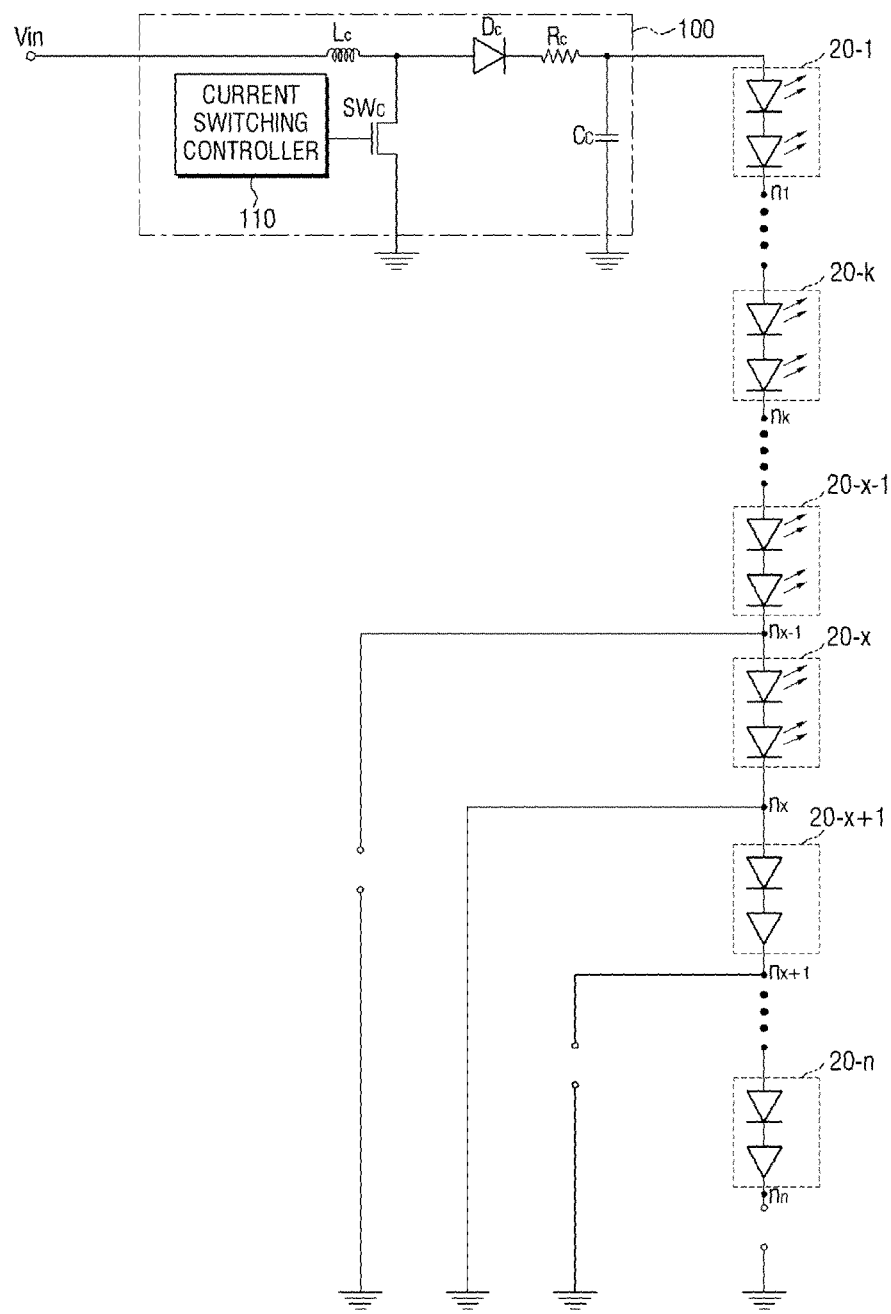
FIG. 17 is an equivalent circuit diagram illustrating an x-th switching unit (where x is a natural number equal to or greater than k) of the automotive LED driving apparatus of FIG. 14 turned on according to an exemplary embodiment of the present disclosure.

FIG. 17 is an equivalent circuit diagram illustrating the x-th switching unit (where x is a natural number equal to or greater than k) of the automotive LED driving apparatus of FIG. 14 turned on. Referring to FIG. 17, when the x-th switching unit $SW_x$ is turned on, the x-th node $n_x$ and the ground may be connected, and the first through (x−1)-th switching units $SW_1$ through $SW_{x-1}$ and the (x+1)-th through n-th switching units $SW_{x+1}$ through $SW_n$ may be turned off. As a result, the first through (k−1)-th feedback paths 200-1 and 200-*k*−1, the k-th through (x−1)-th ground paths 200-*k* through 200-*x*−1, and the (k+1)-th through n-th ground paths 200-*k*+1 and 200-*n* may be blocked.

Particularly, the current input to the first LED group 20-1 may flow to the ground connected to the x-th node $n_x$, and as a result, the first through x-th LED groups 20-1 through 20-*x* may be turned on. When x is equal to or greater than k is turned on, the x-th node $n_x$ may be connected to the ground by the x-th switching unit $SW_x$ in response to the x-th switching unit $SW_x$ being turned on, and as a result, the constant current switching controller 110 may be configured to operate as a boost converter. When the constant current switching controller 110 operates as a boost converter, the equivalent circuit of the constant current switching controller 110 may have a circuit configuration illustrated in FIG. 7. In particular, reference character R of FIG. 7 may represent the equivalent resistor of the first through x-th LED groups 20-1 through 20-*x*.

Figure 18:
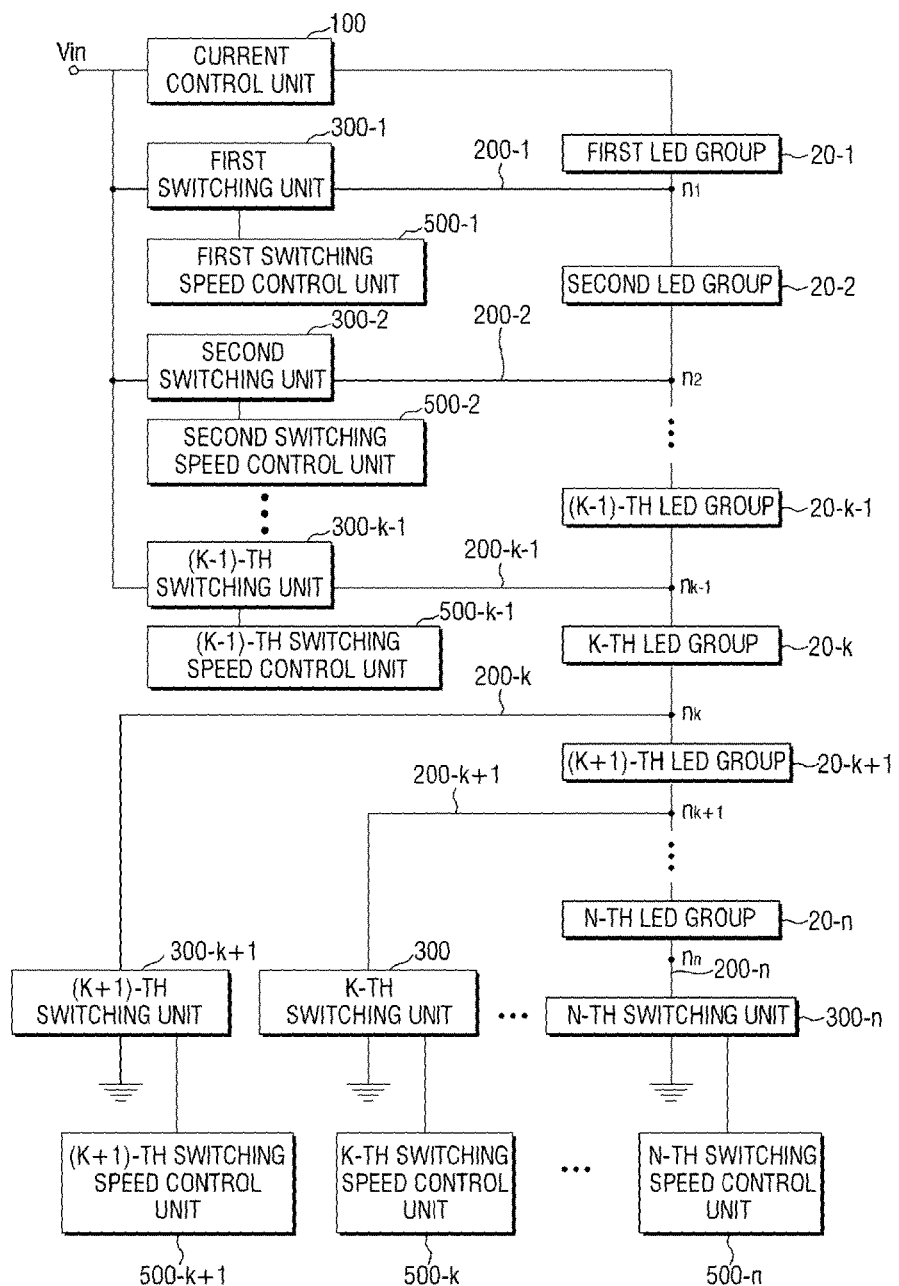
FIG. 18 is a circuit diagram of another example of the automotive LED driving apparatus of FIG. 14 according to an exemplary embodiment of the present disclosure.

FIG. 18 is a circuit diagram of another example of the automotive LED driving apparatus of FIG. 14. Referring to FIG. 18, an automotive LED driving apparatus 10 may be configured to operate an LED unit 20 in which first through n-th LED groups 20-1 through 20-*n* are connected in series, and may include a voltage input unit Vin, a current controller 100, first through (k−1)-th feedback paths 200-1 through 200-*k*−1, k-th through n-th ground paths 200-*k* through 200-*n*, first through n-th switching units 300-1 through 300-*n*, and first through n-th switching speed controllers 500-1 through 500-*n*, wherein n is a natural number equal to or greater than 2 and k is a natural number less than n.

The first through n-th switching speed controllers 500-1 through 500-*n* may be configured to adjust the switching speeds of the first through n-th switching units 300-1 through 300-*n*, respectively. For example, the first through n-th switching speed controllers 500-1 through 500-*n* may be configured to delay the switching speeds of the first through n-th switching units 300-1 through 300-*n*, respectively, by a predetermined amount of time.

The closer x is to n (e.g., as x reaches n), the greater the number of LED groups turned on in response to the x-th switching unit 300-*x*, which is one of the first through n-th switching units 300-1 through 300-*n*, being turned on becomes, and as a result, a voltage that requires adjustment for the current controller 100 to generate a current may increase. Accordingly, the amount of time by which the switching speeds of the first through n-th switching units 300-1 through 300-*n* should be delayed to prevent a flicker phenomenon may increase. In other words, as n increases, the first through n-th switching speed controllers 500-1 through 500-*n* may be set to increase the amount of time by which the switching speeds of the first through n-th switching units 300-1 through 300-*n* are to be delayed.

Each of the first through (k−1)-th switching speed controllers 500-1 through 500-*k*−1 may be configured to include a BJT "TR" and a second RC circuit, and each of the k-th through n-th switching speed controllers 500-*k* through 500-*n* may be configured to include a first RC circuit. Alternatively, each of the first through n-th switching speed controllers 500-1 through 500-*n* may be configured to include a first RC circuit or to include a BJT "TR" and a second RC circuit. Additionally, the first through n-th switching speed controllers 500-1 through 500-*n* may have different elements from one another.

Figure 19:
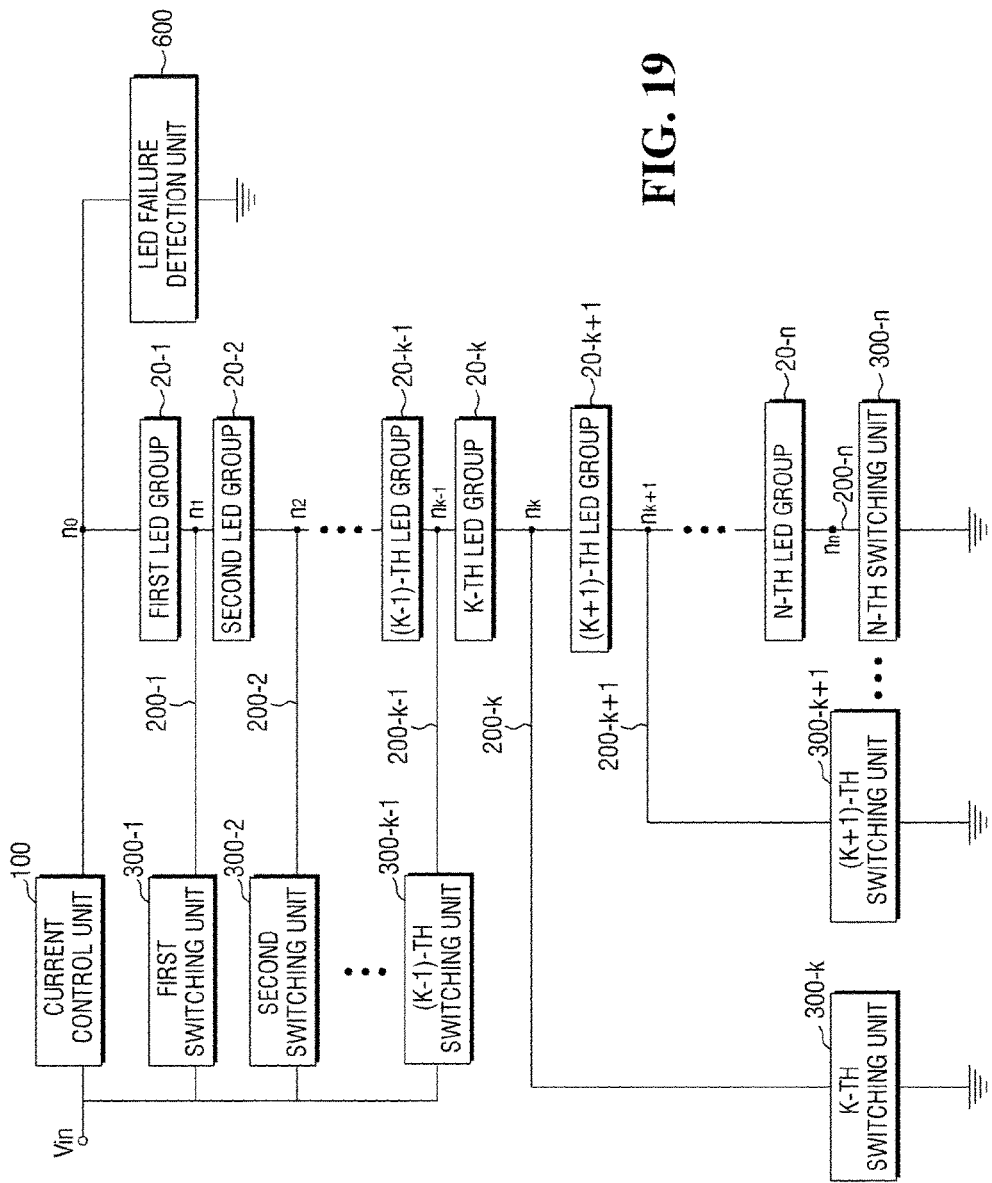
FIG. 19 is a schematic view of an automotive LED driving apparatus according to another exemplary embodiment of the present disclosure.

FIG. 19 is a schematic view of an automotive LED driving apparatus according to another exemplary embodiment of the present disclosure. Referring to FIG. 19, an automotive LED driving apparatus 10 may be configured to operate an LED unit 20 in which first through n-th LED groups 20-1 through 20-*n* are connected in series, and may include a voltage input unit Vin, a current controller 100, first through (k−1)-th feedback paths 200-1 through 200-*k*−1, k-th through n-th ground paths 200-*k* through 200-*n*, first through n-th switching units 300-1 through 300-*n*, and an LED failure detection unit 600, wherein n is a natural number equal to or greater than 2 and k is a natural number less than n.

The LED failure detection unit 600 may be configured to measure a first voltage at an input terminal of the first LED group 20-1, i.e., i.e., a node $n_0$, and may be configured to detect a failure in an LED unit 20 based on the measured first voltage. For example, the LED failure detection unit 600 may be configured to determine whether one or more LED modules included in each of the first through n-th LED groups 20-1 through 20-*n* are open or short based on the measured first voltage. The LED failure detection unit 600 may further be configured to adjust switching operations of the first through n-th switching units 300-1 through 300-*n* to identify the location of failure detected from the LED unit 20 (i.e., the location of any open or short LED module in the LED unit 20).

Figure 20:
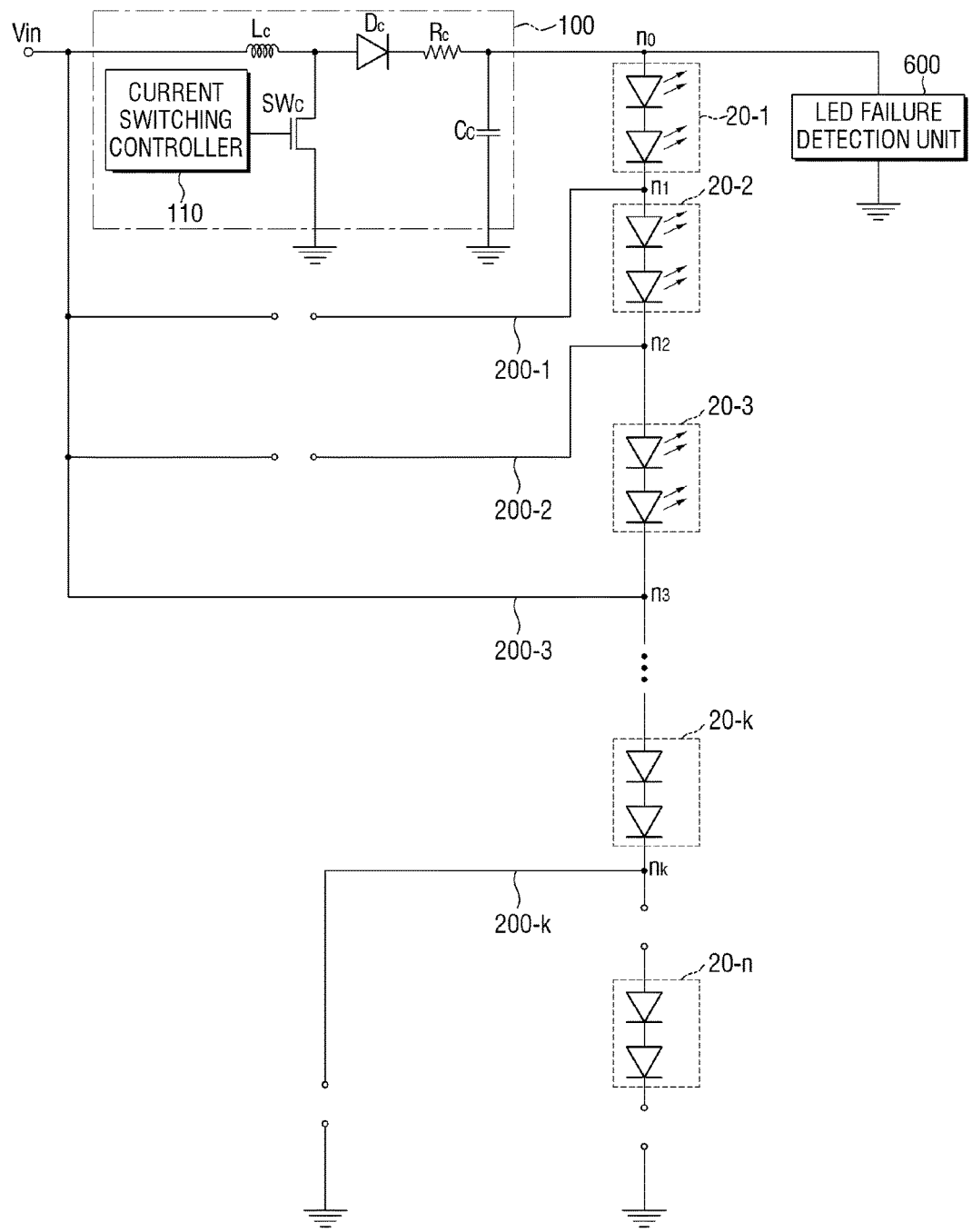
FIG. 20 is a circuit diagram of an example of the automotive LED driving apparatus of FIG. 19 according to an exemplary embodiment of the present disclosure.

The LED failure detection unit 600 of FIG. 19 will hereinafter be described with reference to FIGS. 20 and 21. FIG. 20 is a circuit diagram of an example of the automotive LED driving apparatus of FIG. 19. Referring to FIG. 20, an LED failure detection unit 600 may be configured to measure a first voltage applied to an input terminal $n_0$ of a first LED group 20-1 and determine whether each of a plurality of LED modules included in an LED unit 20 is open or short based on the measured first voltage.

When any one of the LED modules included in the LED unit 20 is open, a current controller 100 may be configured to continue to increase a voltage output to the LED unit 20 to apply a current with a predetermined level to the LED unit 20. As a result, an over-voltage may be applied to the LED unit 20, and the components or elements of the automotive LED driving apparatus 10 or other LED modules in the LED unit 20 may be additionally damaged. Accordingly, the LED failure detection unit 600 may be configured to determine that at least one of the LED modules included in the LED unit 20 is open when the measured first voltage is greater than a predetermined first open reference voltage.

The first open reference voltage may be greater than a maximum voltage capable of being output to the LED unit 20, and may be less than the withstand voltage of a capacitor $C_c$ included in the current controller 100. The LED failure detection unit 600 may be configured to detect the location of any open LED module in the LED unit 20 by operating first through n-th switching units $SW_1$ through $SW_n$. For example, when the measured first voltage is greater than the first open reference voltage, the LED failure detection unit 600 may be configured to turn on the first through n-th switching units $SW_1$ through $SW_n$ one at a time (e.g., independently) in reverse order.

Specifically, when the measured first voltage is greater than the first open reference voltage, the LED failure detection unit 600 may be configured to turn on the n-th switching unit $SW_n$, turn off the other switching units, and measure the first voltage again. Then, when the first voltage measured with the n-th switching unit $SW_n$ turned on is greater than the first open reference voltage, the LED failure detection unit 600 may be configured to turn on the (n−1)-th switching unit $SW_{n-1}$, turn off the other switching units, and measure the first voltage yet again. The measurement of the first voltage while turning on each of the first through n-th switching units $SW_1$ through $SW_n$ may be continued until a first voltage less than the first open reference voltage is detected.

The LED failure detection unit 600 may further be configured to measure the first voltage while turning on the first through n-th switching units $SW_1$ through $SW_n$ one at a time in reverse order, and compare the measured first voltages with the first open reference voltage. Further, when the first voltage measured with the x-th switching unit $SW_x$ (where x is a natural number between 1 and n) turned on is less than the first open reference voltage, the LED failure detection unit 600 may be configured to determine that at least one LED module included in the (x+1)-th LED group 20-x+1 is open. The x-th switching unit $SW_x$ may be the switching unit that produces a first voltage less than the first open reference voltage, for the first time (among the first through n-th switching units $SW_1$ through $SW_n$) when turned on.

In other words, when the first voltage measured with the x-th switching unit $SW_x$ turned on is less than the first open reference voltage, the LED failure detection unit 600 may be configured to detect an open LED module in the (x+1)-th LED group 20-x+1, and proper operation (e.g., without failure or malfunction) of the LED modules included in each of the first through (x−1)-th LED groups 20-1 through 20-x−1. Additionally, when an open LED module in the LED unit 20 is detected, the LED failure detection unit 600 may be configured to output a failure signal to a control device 2 of a vehicle.

The LED failure detection unit 600 may also be configured to transmit location information of failure detected from the LED unit 20 along with the failure signal to the control device 2. The control device 2 may further be configured to operate the LED unit 20 to operate the first through (x−1)-th LED groups 20-1 through 20-x−1, but prevent operation of the x-th through n-th LED groups 20-x through 20-n. In addition, when the measured first voltage is less than a first short reference voltage, the LED failure detection unit 600 may be configured to determine that at least one LED module included in the LED unit 20 is short.

The LED failure detection unit 600 of FIG. 19, which detects any open or short LED module from the LED unit 20, will hereinafter be described in further detail with reference to FIG. 21. FIG. 21 is a circuit diagram of another example of the automotive LED driving apparatus of FIG. 19. The automotive LED driving apparatus of FIG. 21 is similar to the automotive LED driving apparatus of FIG. 20 except that it further includes an LED module voltage detection unit 700, configured to detect the voltage of any one of a plurality of LED modules included in an LED unit 20 to calculate a predetermined short reference voltage required for an LED failure detection unit 600 to determine whether the LED modules included in the LED unit 20 are short.

Figure 21:
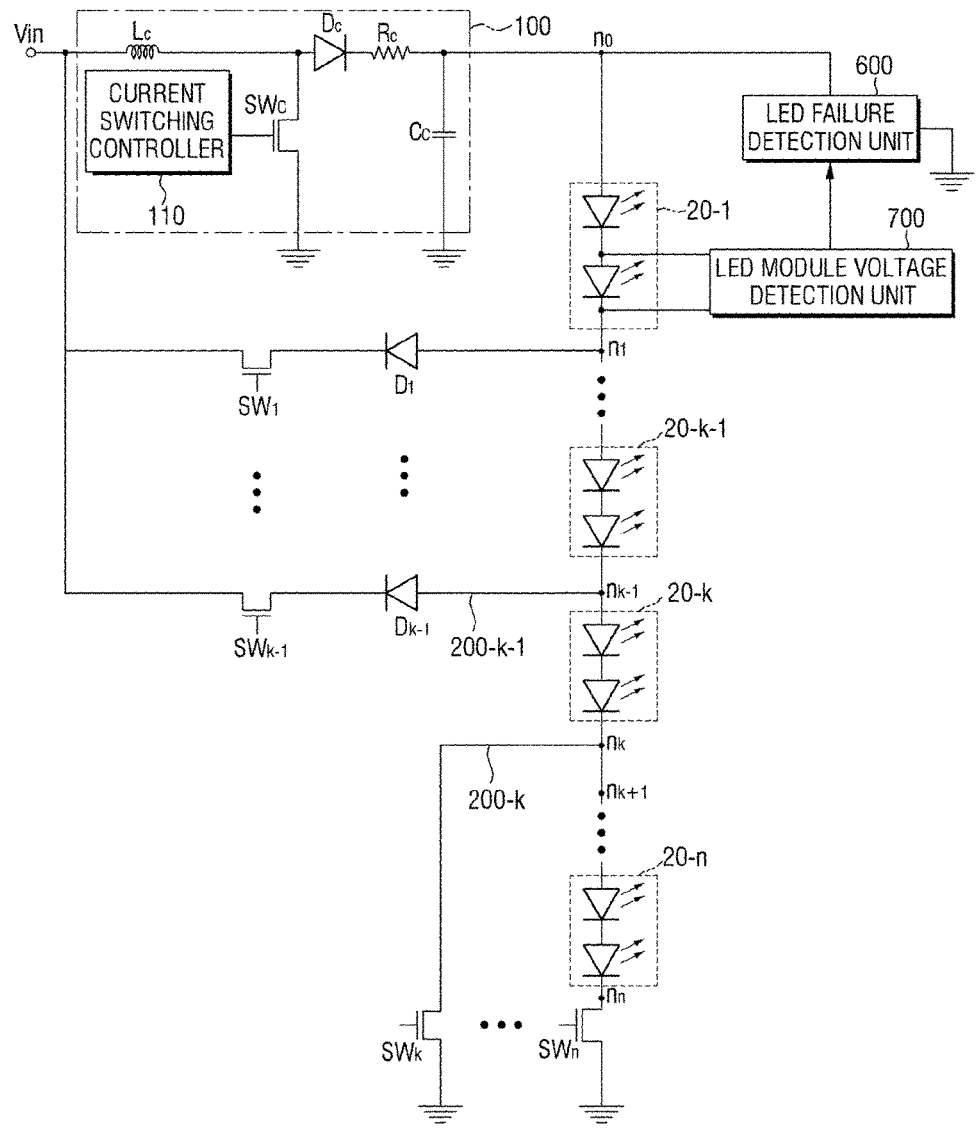
FIG. 21 is a circuit diagram of another example of the automotive LED driving apparatus of FIG. 19 according to an exemplary embodiment of the present disclosure.

Referring to FIG. 21, the LED module voltage detection unit 700 may be configured to measure the voltage of any one of the LED modules included in the LED unit 20. The LED module voltage detection unit 700 may then be configured to output the measured voltage to the LED failure detection unit 600. The LED failure detection unit 600 may be configured to calculate first through n-th short reference voltages by multiplying the total number of LED modules, supplied with a constant current when each of first through n-th switching units $SW_1$ through $SW_n$ is turned on, by the measured voltage provided by the LED module voltage detection unit 700.

Additionally, the LED failure detection unit 600 may be configured to determine whether the LED modules included in the LED unit 20 are short by measuring a first voltage while turning on each of the first through n-th switching units $SW_1$ through $SW_n$, and comparing the measured first voltage with the corresponding short reference voltage. The LED failure detection unit 600 may be configured to identify the location of any short LED module in the LED unit 20 by operating the first through n-th switching units $SW_1$ through $SW_n$. When the first voltage measured with the n-th switching unit $SW_n$ turned on is less than the n-th short reference voltage, the LED failure detection unit 600 may be configured to determine that at least one LED module included in the LED unit 20 is short.

When at least one LED module included in the LED unit 20 is determined to be short, the LED failure detection unit 600 may be configured to measure the first voltage while turning on the first through n-th switching units $SW_1$ through $SW_n$ one at a time in reverse order, and may be configured to compare the measured first voltages with the first through n-th short reference voltages, to thus detect an x-th switching unit $SW_x$ (where x is a natural number less than n) that produces a first voltage less than a corresponding short reference voltage, i.e., the x-th short reference voltage. In response to the x-th switching unit $SW_x$ being detected, the LED failure detection unit 600 may be configured to determine that at least one LED unit included in any one of the (x+1)-th through n-th switching units $SW_1$ through $SW_n$ is short. When a short LED module in the LED unit 20 is detected, the LED failure detection unit 600 may be configured to output a failure signal to a control device 2 of a vehicle. The LED failure detection unit 600 may also be configured to transmit location information of failure detected from the LED unit 20 along with the failure signal to the control device 2.

While exemplary embodiments of the present disclosure are described above, it is not intended that these exemplary embodiments describe all possible forms of the disclosure. Rather, the words used in the specification are words of description rather than limitation, and it is understood that various changes may be made without departing from the spirit and scope of the inventive concept of the present disclosure. Additionally, the features of various implementing exemplary embodiments may be combined to form further exemplary embodiments of the inventive concept of the present disclosure.

What is claimed is:

1. An automotive light-emitting diode (LED) driving apparatus for operating an LED group in which first and second LED groups are connected in series, the automotive LED driving apparatus comprising:
  a voltage input unit configured to receive an input voltage from a power device of a vehicle;
  a current controller configured to generate a current with a predetermined level by adjusting the input voltage, received from the voltage input unit, and configured to provide the generated current to an input terminal of the first LED group;
  a first feedback path configured to feed back a voltage applied to a first node, connected to an output terminal of the first LED group, to an input terminal of the current controller;
  a first switching unit disposed on the first feedback path and switched on or off based on a control signal received from a control device of the vehicle; and a second switching unit disposed between an output terminal of the second LED group and a ground and switched on or off based on the control signal,
wherein when the control signal is a first control signal to turn on the first LED group, the first switching unit is turned on, the second switching unit is turned off, and the current controller is operated as a buck-boost converter, and
wherein when the control signal is a second control signal to turn on the first and second LED groups, the second switching unit is turned on, the first switching unit is turned off, and the current controller is configured to operate as a boost converter.

2. The automotive LED driving apparatus of claim 1, wherein the current controller includes:
an LC filter having a first side connected to the input terminal of the current controller and a capacitor connected in parallel to a LED unit, wherein the LED unit includes the first and second LED groups;
a current control switch connected between a second side of the inductor and the ground and providing a current with the predetermined level by adjusting a voltage charged into, or discharged from, the LC filter based on a switching operation;
a diode configured to block a reverse flow of a current output to the LED unit;
a current measuring resistor connected between the diode and the capacitor; and
a current switching controller configured to measure a voltage applied to the current measuring resistor and generate a current with the predetermined level by turning the current control switch on or off based on the measured voltage.

3. The automotive LED driving apparatus of claim 1, further comprising:
a first switching speed controller configured to adjust a switching speed of the first switching unit; and
a second switching speed controller configured to adjust a switching speed of the second switching unit.

4. The automotive LED driving apparatus of claim 3, wherein each of the first and second switching units includes a switching element having a gate to which the control signal is input.

5. The automotive LED driving apparatus of claim 4, wherein the first and second switching speed controllers are configured to delay the switching speeds of the first and second switching units, respectively, by a predetermined amount of time.

6. The automotive LED driving apparatus of claim 5, wherein the predetermined amount of time is in a range of about 0.1 ms to 50 ms.

7. The automotive LED driving apparatus of claim 5, wherein the first or second switching speed controller has a time constant that corresponds to the predetermined amount of time and includes a first RC circuit connected to the gate of the switching element.

8. The automotive LED driving apparatus of claim 7, wherein the first RC circuit includes:
a first resistor having a first side connected to an input terminal to which the control signal is input and a second side connected to the gate of the switching element; and
a first capacitor having a first side connected to the gate of the switching element and a second side connected to the ground.

9. The automotive LED driving apparatus of claim 7, wherein the control signal is delayed by the predetermined amount of time by the first RC circuit and is then input to the first or second switching unit.

10. The automotive LED driving apparatus of claim 1, further comprising:
an LED failure detection unit configured to measure a first voltage at the input terminal of the first LED group and determine whether failure has occurred in a LED unit based on the measured first voltage, wherein the LED unit includes the first and second LED groups.

11. The automotive LED driving apparatus of claim 10, wherein when the measured first voltage is greater than a predetermined first open reference voltage, the LED failure detection unit is configured to detect that at least one LED module included in the LED unit is open.

12. The automotive LED driving apparatus of claim 11, wherein when at least one LED module included in the LED unit is detected to be open, the LED failure detection unit is configured to identify the location of the at least one open LED module by operating the first and second switching units.

13. The automotive LED driving apparatus of claim 12, wherein when at least one LED module included in the LED unit is detected to be open, the LED failure detection unit is configured to turn on the first and second switching units one at a time.

14. The automotive LED driving apparatus of claim 13, wherein
when the first voltage measured with the second switching unit turned on is greater than the first open reference voltage and the first voltage measured with the first switching unit turned on is greater than the first open reference voltage, the LED failure detection unit is configured to detect an open LED module in the first LED group, and
when the first voltage measured with the second switching unit turned on is greater than the first open reference voltage and the first voltage measured with the first switching unit turned on is less than the first open reference voltage, the LED failure detection unit is configured to detect an open LED module in the second LED group.

15. The automotive LED driving apparatus of claim 11, wherein the first open reference voltage is greater than a maximum voltage capable of being output to the LED unit, and is less than a withstand voltage of a capacitor included in the current controller.

16. The automotive LED driving apparatus of claim 10, wherein when the measured first voltage is less than a predetermined short reference voltage, the LED failure detection unit is configured to determine that at least one LED module included in one of the first and second LED groups is short.

* * * * *